United States Patent [19]
Barr et al.

[11] Patent Number: 5,408,441
[45] Date of Patent: Apr. 18, 1995

[54] METHOD FOR SEISMIC EXPLORATION IN ARTIC REGIONS

[75] Inventors: Frederick J. Barr; Gary A. Sitton, both of Houston; David L. Nyland, Sugarland, all of Tex.

[73] Assignee: Halliburton Company, Houston, Tex.

[21] Appl. No.: 109,833

[22] Filed: Aug. 20, 1993

[51] Int. Cl.[6] .............................................. G01V 1/38
[52] U.S. Cl. ................................... 367/15; 367/21; 367/37; 367/38; 181/101; 181/112
[58] Field of Search ..................... 367/15, 21, 37, 38; 181/101, 108, 112

[56] References Cited

U.S. PATENT DOCUMENTS

| | | | |
|---|---|---|---|
| 4,232,381 | 11/1980 | Rennick et al. | 367/135 |
| 4,388,711 | 6/1983 | Fay | 367/135 |
| 4,621,347 | 11/1986 | Ostrander . | |
| 4,890,264 | 12/1989 | Crews et al. | 367/45 |
| 4,894,808 | 1/1990 | Pedley et al. | 367/21 |
| 5,031,718 | 7/1991 | Peavey | 181/114 |
| 5,253,223 | 10/1993 | Svenning et al. | 367/178 |

OTHER PUBLICATIONS

Shei et al; Flexural Waves in Floating Ice; 1983 Society of Exploration Geophysicists Convention, Place of Publication Unknown; pp. 258–261.
Lansley et al; Surface Sources on Floating Ice: The Flexural Ice Wave; 1984 Society of Exploration Geophysicists Convention; Place of Publication Unknown; pp. 828–831.
McConnel et al; Dispersive Noise Attenuation; 1986 Society of Exploration Geophysicists Convention, Place of Publication Unknown; pp. 455–458.
Barton, et al; Flexural Waves on Arctic Data; 1986 Society of Exploration Geophysicists Convention, Place of Publication Unknown, pp. 458–461.
Press et al., "Air-Coupled Flexural Waves in Floating Ice", 32 Trans. Amer. Geophysicists Union, Place of Publication Unknown, pp. 166–172.
Press & Ewing; "Theory of Air-Coupled Flexural Waves," 22 Journal of Applied Physics, Place of Publication Unknown, pp. 22, 829–899.
Barr, et al; "Attenuation of Flexural Ice Waves and Random Noise Using Both Geophones and Hydrophones"; Submitted to Society of Exploration Geophysicists in Feb. 1993; no publication has occurred as of the filing of the present application; pp. 1–4.

*Primary Examiner*—J. Woodrow Eldred
*Attorney, Agent, or Firm*—Arnold, White & Durkee

[57] ABSTRACT

A method for obtaining seismic data in frigid regions without interference from flexural ice waves. In an exemplary embodiment, seismic data is produced by using an energy source to generate a seismic wave in a floating ice sheet. Seismic disturbances caused by the energy source are detected by one or more hydrophones and geophones, which produce hydrophone and geophone response signals, respectively. In a first embodiment, the hydrophone response signal is integrated. The integrated signal and/or the geophone response signal are scaled, and the two signals are then added. Alternatively, instead of integrating the hydrophone response signal, the geophone response signal may be differentiated prior to scaling and summing. A method is also disclosed for overcoming phase errors that might be introduced, for example, by the use of a transformer-coupled hydrophone. In another embodiment of the invention, a linear adaptive filter is applied to the hydrophone and geophone response signals to obtain an output signal having attenuated noise characteristics.

58 Claims, 17 Drawing Sheets

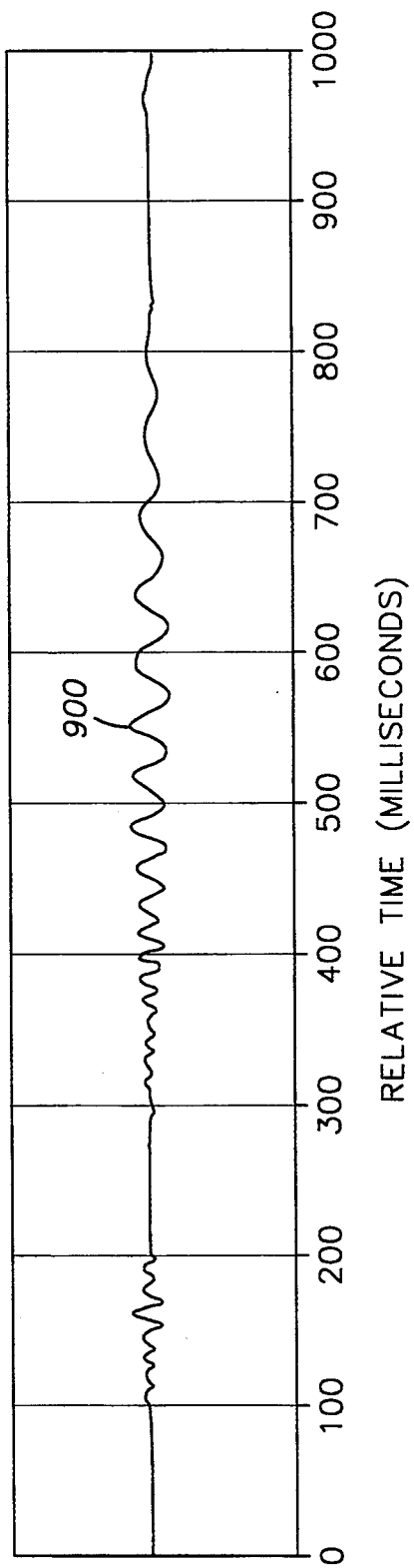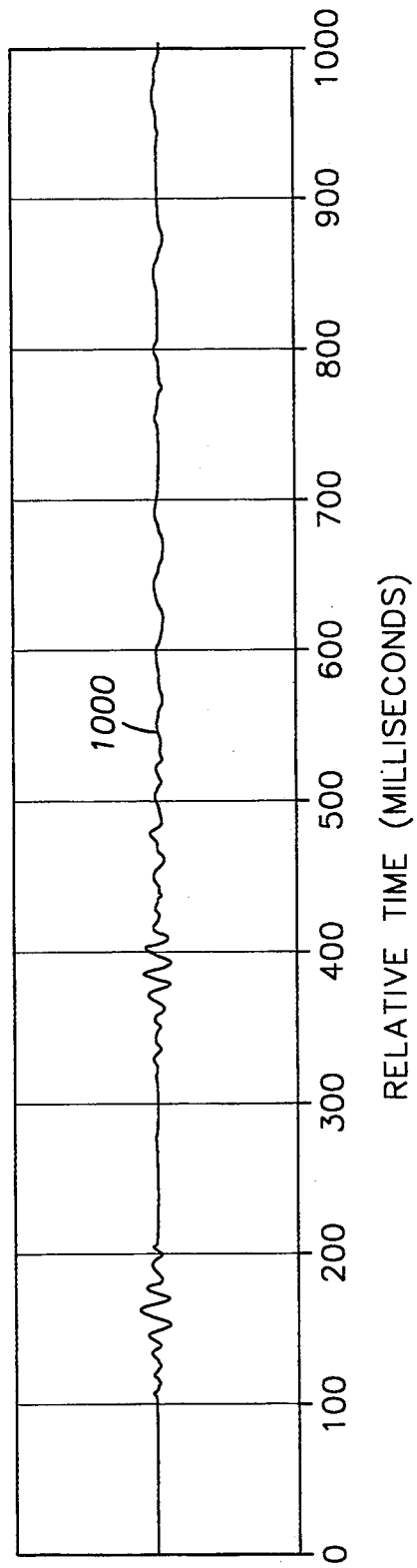

METHOD FOR SEISMIC EXPLORATION IN ARTIC REGIONS

BACKGROUND OF INVENTION

1. Field of Invention

The present invention relates to seismic exploration. More particularly, the invention concerns a method for attenuating flexural ice waves and random noise during seismic exploration in arctic regions by using signals from hydrophones and geophones.

2. Description of Related Art

Due to the increasing-cost of importing petroleum products such as crude oil, more and more attention has been given to locating new petroleum resources in remote regions such as the arctic. And, like seismic exploration in non-arctic regions, seismic exploration in the arctic regions is usually performed using surface energy sources, rather than "shothole dynamite" or other older methods. Surface seismic energy sources are favored for economic as well as environmental reasons.

An example of a surface energy source is the Vibroseis ® system (Vibroseis is a registered trademark of Conoco). With the Vibroseis system, a movable reaction mass is utilized to direct low frequency vibration signals through the earth. Typically, a specially-equipped truck contains a housing that supports the reaction mass. During operation, a base plate is coupled to solid ground, such as the earth's surface or a layer of ice that covers the earth's surface. The reaction mass is connected to a two-sided piston and the base plate. High pressure hydraulic fluid reciprocates within the housing surrounding the piston, causing the reaction mass to vibrate up and down with respect to the ground. The vibration of the reaction mass generates low frequency signals that penetrate the earth through the base plate.

As with other methods using surface sources, the seismic signal is reflected with varying angles and intensities by various matter within the earth. One or more seismic detectors receive the reflected signals at the earth's surface, a memory device stores the received signals, and a computer is used to refine and interpret the stored signals.

In the Vibroseis system, the reaction mass is vibrated to generate a constant amplitude seismic signal having a frequency that varies linearly or nonlinearly with time. The received signal, when cross-correlated with the signal generated by the vibrating energy source, is similar to reflected signals originating from explosive sources.

When using a surface energy source to conduct seismic exploration in arctic regions, the seismic data may contain noise in some situations. Specifically, when a layer of water exists between a layer of floating ice and the earth, the ice is permitted to flex in response to vibrational seismic signals created by seismic energy sources. In some cases, the ice may even move as much as 2–3 centimeters near the energy sources. This flexion of the floating ice sheet generates high amplitude dispersive noise waves (called "flexural ice waves" or "flex waves", for short). The flexural ice waves efficiently propagate from the seismic sources through the ice the receivers, and severely mask the simultaneously arriving, weaker seismic signals reflected by the earth. In some cases, flexural ice waves on the order of 80 decibels (dB) have been recorded. In other words, seismic data signals may be a factor of 10,000 times weaker than overlying flexural ice waves.

Floating ice sheets are often associated with seasonal ice, i.e., ice that alternately forms and disappears with changes of seasons. However, when an ice sheet is in direct contact with the land beneath it, flexural ice waves are negligible, since the contact between the ice and the earth limits ice flexion to small amounts.

When the Vibroseis system is utilized in conjunction with a floating ice sheet, one or more geophones are affixed to the surface of the ice. The flexural ice waves interfere with the data received by the geophones attached to the ice, since the flexural ice waves propagate horizontally through the ice sheet. One method to eliminate the noise created by flexural ice waves is discussed in "Surface Sources on Floating Ice: The Flexural Ice Wave," by Lansley, Eibert, and Nyland, 54th Annual International Meeting of the Society of Exploration Geophysical, Expanded Abstracts, 1984, pp. 828–831. The Lansley method utilizes an "ice saw" to cut an opening through the ice sheet, somewhere between the seismic source and the receivers, and thereby create discontinuities in the ice that help attenuate flexural ice waves.

With the Lansley method, the discontinuities in the ice have been known to provide about 20 dB of flexural ice wave attenuation. However, for some applications, the Lansley approach is not as useful as some might like. In particular, the Lansley method is limited since, even though Lansley cuts an opening in the ice, the flexural ice waves may pass around the opening, introducing substantial interference into signals created by hydrophones and/or geophones used in the system.

Other methods have approached the flexural ice wave problem with various processing algorithms. One example is that of Barton et al, entitled "Flexural Ice Waves On Arctic Data: Application of New Techniques for S/N Enhancement," 56th Annual International Meeting of Society of Exploration Geophysicists, Expanded Abstracts, 1986, Session S8.7. Another example of a processing algorithm is McConnell et al "Dispersive Noise Attenuation," 56th Annual International Meeting of Society of Exploration Geophysicists, Expanded Abstracts, 1986, Session S8.6. Although these methods have achieved some improvement, and may even be satisfactory for some purposes, they are not entirely adequate in some applications.

BRIEF SUMMARY OF INVENTION

The present invention concerns a method for attenuating flexural ice waves and random noise during seismic exploration in arctic regions by using both hydrophone and geophone signals. A vibrating seismic source is used to generate a seismic signal in the floating ice sheet. In an illustrative embodiment, the resultant flexural ice wave and the underlying reflected seismic data are detected by one or more stations, each including a hydrophone and one or more geophones. The hydrophone and geophone response signals are modified and combined to eliminate noise caused by physical disturbances of the ice or by flexural ice waves; the underlying reflected seismic data is also enhanced in the process. In one embodiment, the hydrophone response signal is integrated, the geophone response signal and/or the integrated hydrophone response signal are scaled, and the two signals are added. Alternatively, the geophone response signal may be differentiated, the hydrophone response signal and/or the differentiated geophone response signal scaled, and the two signals are added.

Additional steps are also disclosed to correct phase errors that may be introduced by, for example, the use of a transformer in the hydrophone units. Specifically, the hydrophone and geophone response signals are normalized, converted into the frequency domain by Fast Fourier Transform operations, processed and combined to eliminate the flexural ice wave noise.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein:

FIG. 9 is a graph illustrating the sum of the response 700 and an integrated, scaled version of the response 702, in accordance with the invention;

FIG. 10 is a graph illustrating a summed time domain signal 1000 obtained by applying a 10° phase correction to the integrated hydrophone response 702 prior to amplitude adjustment and addition to the geophone response 700, in accordance with the invention;

DESCRIPTION OF A PREFERRED EMBODIMENT

Theory

To understand the operation of the invention, it is helpful to consider the relationship between the response of geophones and hydrophones to flexural ice waves and vertically propagating reflections of seismic signals. This discussion analyzes the operation of a geophone-hydrophone pair, where the geophone is placed on the upper surface of a floating ice sheet, and the hydrophone is positioned near the lower surface of the ice sheet, in the water. Alternatively, a hole may be drilled in the floating ice sheet, and the hydrophone submerged in water that resides in the hole. It is assumed that the impulse responses of the geophone and the hydrophone are perfectly matched. Geophones and hydrophones each transform different physical disturbances into electrical signals: geophones transform particle velocity, and hydrophones transform pressure. As the surface seismic energy source imparts its vertical force upon the floating ice sheet, the flexural wave propagates horizontally away from the energy source toward the seismic detectors. As the flex wave passes a geophone-hydrophone pair, the floating ice sheet moves vertically and causes a voltage to be generated by the geophone. This vertical motion also causes a change in the hydrostatic pressure in the water below the ice, which is detected by the hydrophone.

Figure 1:
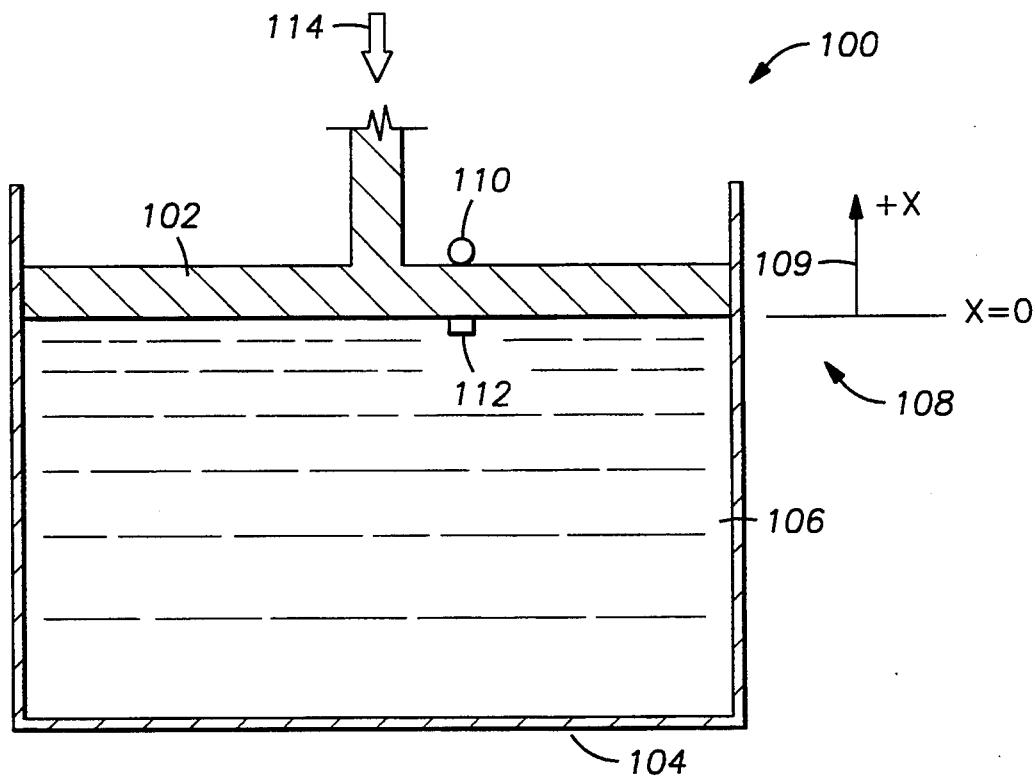
FIG. 1 is an illustration of a piston model 100 to explain the operation of hydrophones and geophones in the presence of flexural ice waves.

This relationship is further illustrated using a piston model 100, as shown in FIG. 1. The model 100 is used to represent the relationship between the floating ice sheet, water, and earth. Specifically, a piston 102 represents the floating ice sheet, and a casing 104 represents the earth. Trapped between the piston 102 and the casing 104 is a fluid 106, representative of the water underneath the floating ice sheet. A coordinate system 108 is shown to indicate an x-axis 109, which will be used to describe events associated with the model 100.

A geophone 110 is located atop the piston 102, and a hydrophone 112 is positioned beneath the piston 102. When a force 114 is applied to the piston 102, the geophone 110 detects motion (i.e., v(t)) along the x-axis 109, and the hydrophone 112 detects pressure (i.e., p(t)) experienced by the water 106 due to the motion of the piston 102. If the force 114 is a function of time, the pressure experienced by the hydrophone 112 will be proportional to the force 114 divided by the area of the piston 102, as shown in Equation 1 (below).

$$p(t) \alpha F(t)/A \qquad [1]$$

In Equation 1, $\alpha$ is used to denote "proportional to," p(t) represents the pressure experienced by the hydrophone 112 as a function of time, F(t) represents the force 114, and A represents the area of the piston.

The force 114 can also be expressed as a product of mass times acceleration, as shown in Equation 2 (below).

$$F(t) = ma(t) = -m \frac{d^2 x(t)}{dt^2} \qquad [2]$$

In Equation 2, m represents the mass of the piston 102, a(t) represents the acceleration of the piston 114 as a function of time with respect to the x-axis 109, and x(t) represents the position of the piston 114 as a function of time with respect to the x-axis 109.

Combining Equations 1 and 2, Equation 3 is obtained (below).

$$p(t) \propto -\frac{m}{A} \frac{d^2 x(t)}{dt^2} \qquad [3]$$

Because the geophone 110 translates velocity into an electrical signal, the response of the geophone 110 may be expressed as shown in Equation 4 (below).

$$v(t) \propto \frac{dx(t)}{dt} \qquad [4]$$

The term "v(t)" represents the velocity of the piston 102 as a function of time, which is representative of the response of the geophone 110. By combining Equations 3 and 4, Equation 5 is obtained (shown below).

$$p(t) \propto -\frac{m}{A} \frac{dv(t)}{dt} \qquad [5]$$

Equation 5 demonstrates that the response of the hydrophone 112 is equal, but opposite in polarity, to the derivative of the response of the geophone 110 multiplied by a constant. In the case of a floating ice sheet, the effective mass and area (i.e., m and A) may not be known, but they may simply be represented by a constant.

Figure 2A:
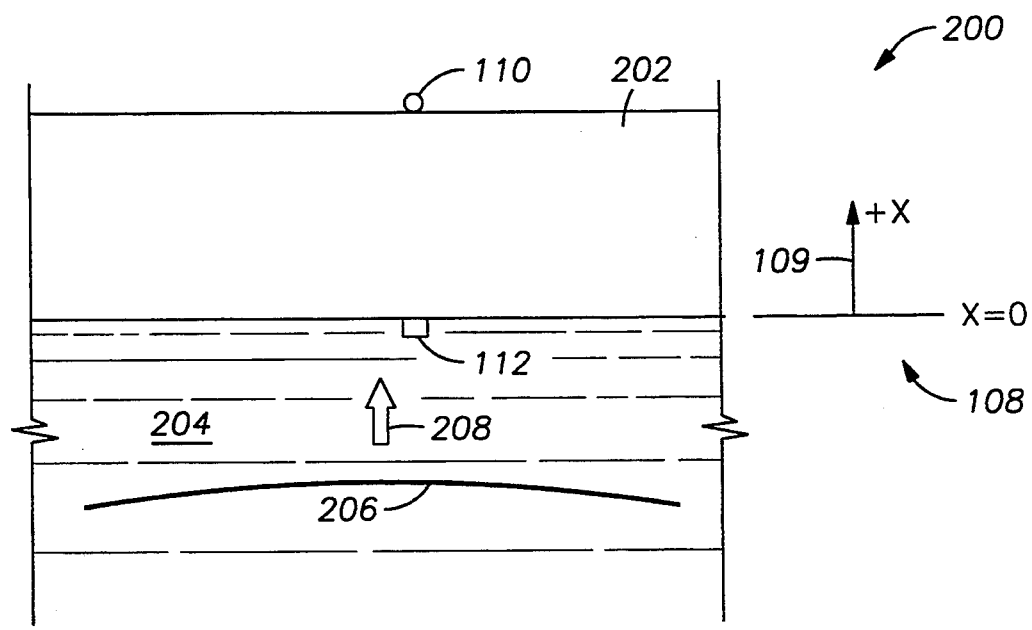
FIG. 2A is a side view of a model 200 used to explain geophone and hydrophone responses to a compressional wave 206 caused by reflections of signals from a seismic source, wherein the compressional wave 206 arrives vertically from below.

FIG. 2A depicts a model 200 of a seismic detecting arrangement and geophone and hydrophone signals that are responsive to a compressional wave 206 arriving in a vertical direction 208. The compressional wave 206 is representative of a seismic signal generated by a seismic source (not shown) and reflected by one or more layers of earth (not shown). The model 200 includes a layer of ice 202 and a layer of water 204, the geophone 110, and the hydrophone 112. The coordinate system 108 is shown next to the model 200 for reference.

The acoustic characteristics of the floating ice sheet 202 and the water 204 are assumed to be standard. In particular, if the water 204 is salt water, for example, the compressional velocity ($c_1$) is assumed to be 1450 m/s, and the density ($\rho_1$) is assumed to be 1200 kg/m$^3$. For the ice sheet 202, the compressional velocity ($c_2$) is assumed to be 3600 m/s, and the density ($\rho_2$) is assumed to be 1080 kg/m$^3$.

Figure 2B:
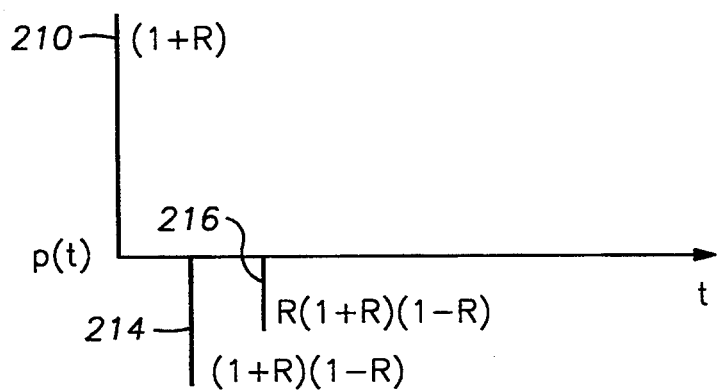
FIG. 2B is a graph that illustrates the impulse response of a hydrophone 112 to the compressional wave 206.
Figure 2C:
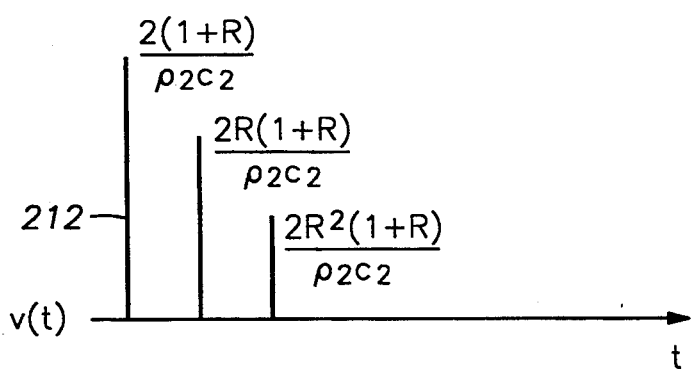
FIG. 2C is a graph that illustrates the impulse response of a geophone 110 to the compressional wave 206.

FIGS. 2B and 2C show the responses of the hydrophone 112 and the geophone 110, respectively, to a compressional unit impulse arriving from below. FIGS. 2B and 2C were derived as follows. For a plane wave propagating in the positive x direction along the x-axis 109 in a medium with density $\rho$ and compressional velocity c, the relationship between the velocity and the pressure of the wave is shown in Equation 6 (below).

$$v(t) = \frac{1}{\rho c} p(t) \qquad [6]$$

For a wave traveling in the negative x direction, the relationship is that of Equation 7 (below).

$$v(t) = \frac{-1}{\rho c} p(t) \qquad [7]$$

If we define the quantity "$\zeta$" as shown in Equation 8, the reflection coefficient for water-to-ice (R in Equation 9) and the ice-to-water reflection coefficient ($R_2$ in Equation 10) may be more concisely expressed.

$$\zeta = \frac{\rho_2 c_2}{\rho_1 c_1} \qquad [8]$$

$$R = \frac{\zeta - 1}{\zeta + 1} \qquad [9]$$

$$R_2 = \frac{1/\zeta - 1}{1/\zeta + 1} = \frac{1 - \zeta}{1 + \zeta} = -R \qquad [10]$$

The water-to-ice and ice-to-water transmission constants (T and $T_2$) are expressed in Equations 11 and 12, respectively (below).

$$T = \frac{2\zeta}{\zeta + 1} + = (1 + R) \qquad [11]$$

$$T_2 = \frac{2/\zeta}{1/\zeta + 1} = \frac{2}{\zeta + 1} = (1 - R) \qquad [12]$$

When a unit amplitude pressure wave arrives at the hydrophone 112, it is transmitted into the ice with an amplitude of (1+R), in accordance with Equation 11. During normal seismic operations, the pressure is assumed to be continuous across the interface between the floating ice sheet 202 and the water 204; otherwise, boundary layer separation would occur. Accordingly, the pressure amplitude sensed by the hydrophone is (1+R). This is shown in FIG. 2B, as a first element 210 of p(t). When this wavefront of amplitude (1+R) arrives at the top of the floating ice sheet 202, it encounters a reflection coefficient of $-1$. As a result, the geophone 110 experiences two wavefronts at the same time—one moving upward and one reflected downward. Using Equation 6 for the upward traveling wave and Equation 7 for the downward wave, and substituting (1+R) for p(t), the amplitude of the particle velocity at that instant is expressed in Equation 13 (below).

$$v = \frac{1 + R}{\rho_2 c_2} + \frac{(-1)[-(1 + R)]}{\rho_2 c_2} = \frac{2(1 + R)}{\rho_2 c_2} \qquad [13]$$

This is shown in FIG. 2C as a first element 212 of v(t).

The pressure wave of amplitude $(-1)(1+R)$ propagates back down to the interface between the floating ice sheet 202 and the water 204, and is transmitted into the water 204 with amplitude of $(-1)(1+R)(1-R)$, in accordance with the transmission coefficient of Equation 12. This is illustrated in FIG. 2B, as a second element 214 of p(t). Inside the floating ice sheet, the downward propagating pressure wave encounters a reflection coefficient of $-R$ at the interface between the floating ice sheet 202 and the water 204, in accordance with Equation 10, and is reflected upward with an amplitude of $(-R)[-(1+R)(1-R)] = R(1+R)(1-R)$. This is illustrated in FIG. 2B as a third element 216 of p(t).

The remaining elements of p(t) and v(t) may be calculated by continuing this analysis, with several exemplary elements shown in FIGS. 2B and 2C. The responses p(t) and v(t) of FIGS. 2B and 2C were derived assuming that the transduction constants of both the geophone 110 and the hydrophone 112 are equal to 1. If this were true, the electrical signals from the geophone 110 would be about $2 \times 10^{6^6}$ times smaller than those from the hydrophone 112. Actual transduction constants for hydrophones, however, are closer to $10^{-5}$ volts/Newton/meter$_2$, and actual transduction constants for geophones are about $10^2$ volts/meter/second. Thus, the actual output signal levels of a geophone 110 and a hydrophone 112 are of similar magnitude.

Figure 3:
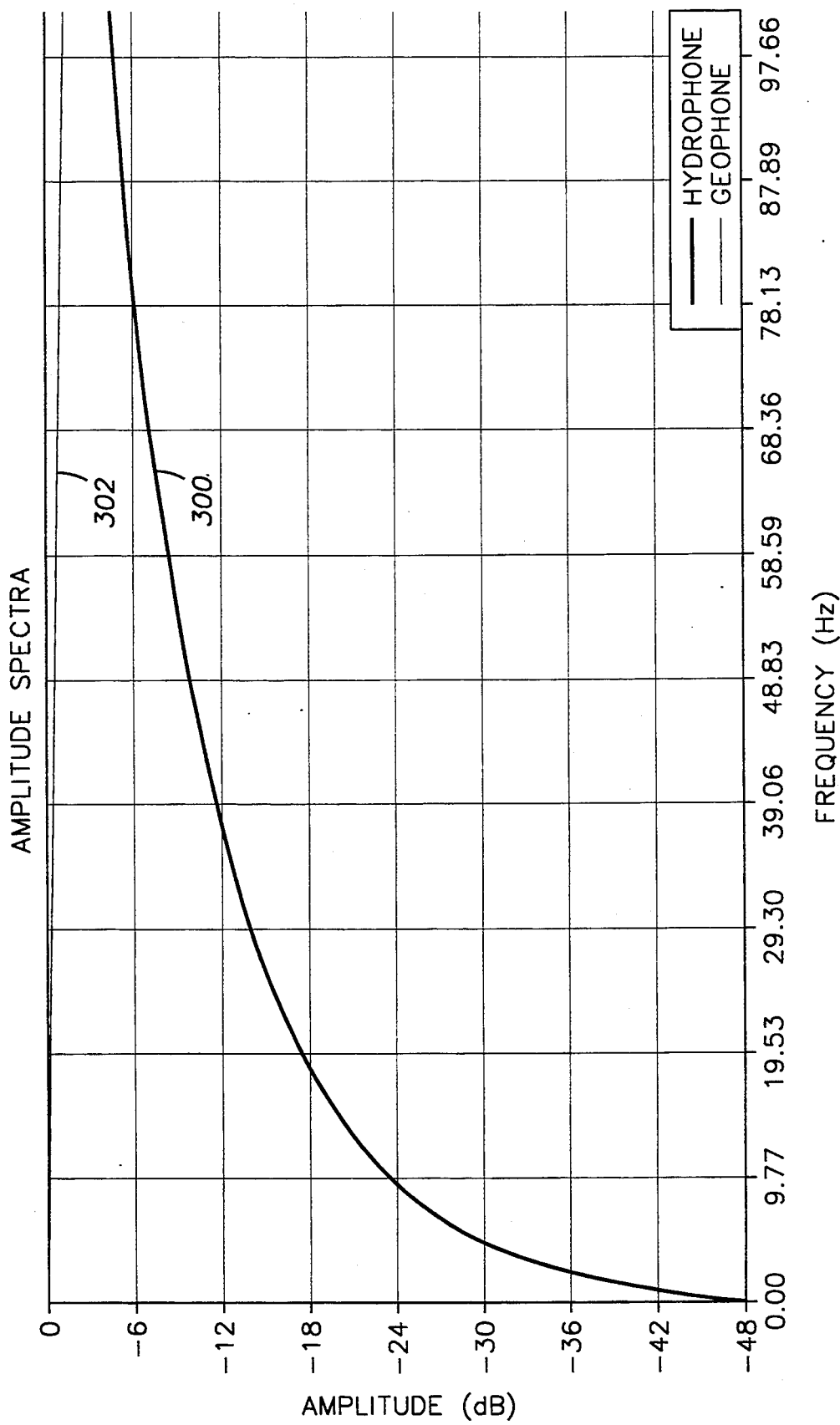
FIG. 3 is a graph illustrating the amplitude spectra corresponding to the responses of the hydrophone 112 (i.e., p(t)) and the geophone 110 (i.e., v(t))
Figure 4:
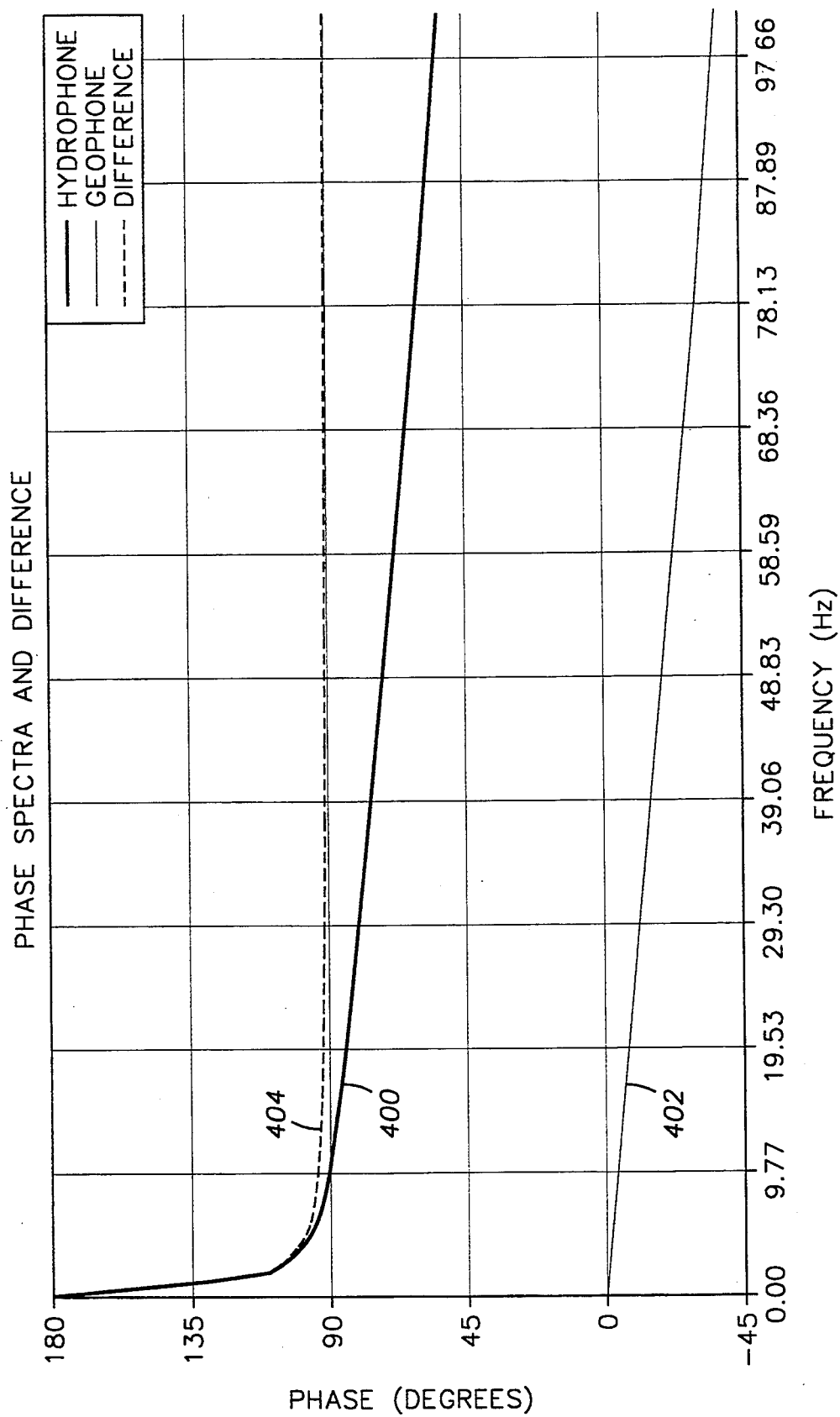
FIG. 4 is a graph illustrating the phase spectra corresponding to the responses of the hydrophone 112 (i.e., p(t)) and the geophone 110 (i.e., v(t))

For ease of explanation, this discussion will assume that the transduction constant of the geophone 110 is $\rho_2 c_2/2$ times larger than the transduction constant of the hydrophone 112. With this assumption, the amplitudes of the first elements 210 and 212 of p(t) and v(t) are equal to $(1+R)$. The amplitude and phase spectra of p(t) and v(t) are compared in FIGS. 3 and 4, respectively. As shown in FIG. 3, the amplitude spectrum of p(t) (indicated by 300) rises 6 dB per octave relative to v(t) (indicated by 302); also, the phase spectrum of p(t) (indicated by 400) leads that of v(t) (indicated by 402) by a difference (indicated by 404) of about 90° for frequencies of about 10 Hz and higher. For reflections, then, the pressure signal is proportional to the derivative of the velocity signal, as expressed in Equation 14 (below).

$$p(t) \propto \frac{dv(t)}{dt} \quad [14]$$

It was previously stated in Equation 5 that, for flexural ice waves, the pressure signal is proportional to the negative of the derivative of the velocity signal.

$$p(t) \propto -\frac{m}{A} \frac{dV(t)}{dt} \quad [5]$$

Equations 14 and 5, then, indicate the following results: Regarding the flexural ice wave, differentiating v(t) produces a signal that is opposite in polarity to p(t), and differs in amplitude from p(t) by a constant (Equation 5). Therefore, by differentiating v(t), multiplying it by a constant (a "scale factor"), and adding it to p(t), the flexural ice wave could be eliminated. A similar result could be achieved by integrating p(t), reducing it by the same scale factor, and adding it to v(t). Furthermore, by performing the above-mentioned operations, the reflected wave would be enhanced (Equation 14).

Experimental Results

A number of tests were performed in the arctic where the ice, water, and earth resembled the model 200 of FIG. 2A. In these tests, the geophone 110 comprised a string of 12 geophones, with each geophone being mounted on the surface of the floating ice sheet at the same location as the others. In addition, the seismic source was positioned on the surface of the ice, about 1471 feet from the geophones 110.

Figure 5:
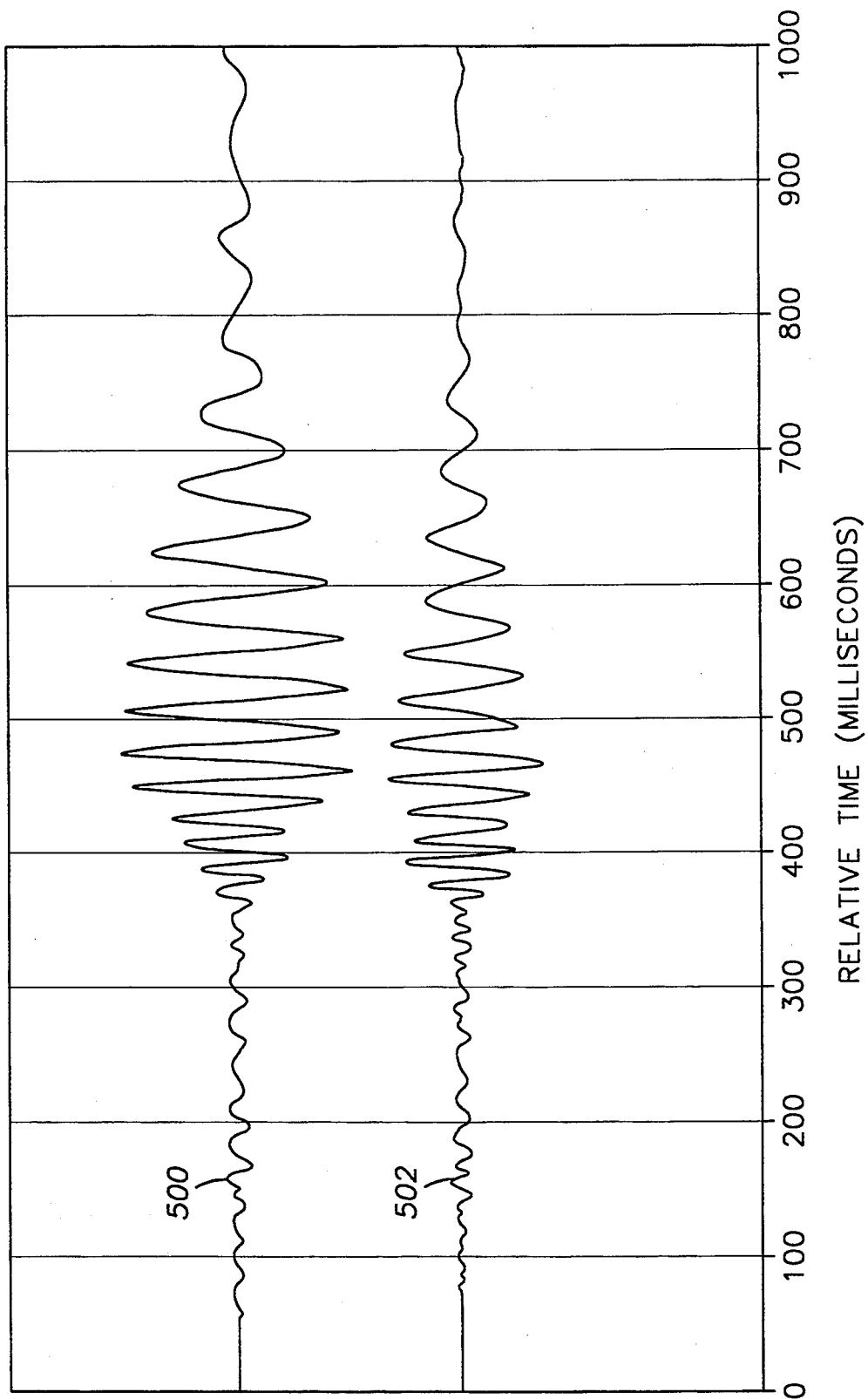
FIG. 5 is a graph illustrating a summed and correlated geophone response 500 and a hydrophone response 502, wherein both traces exhibit responsiveness to the flexural ice wave.
Figure 6:
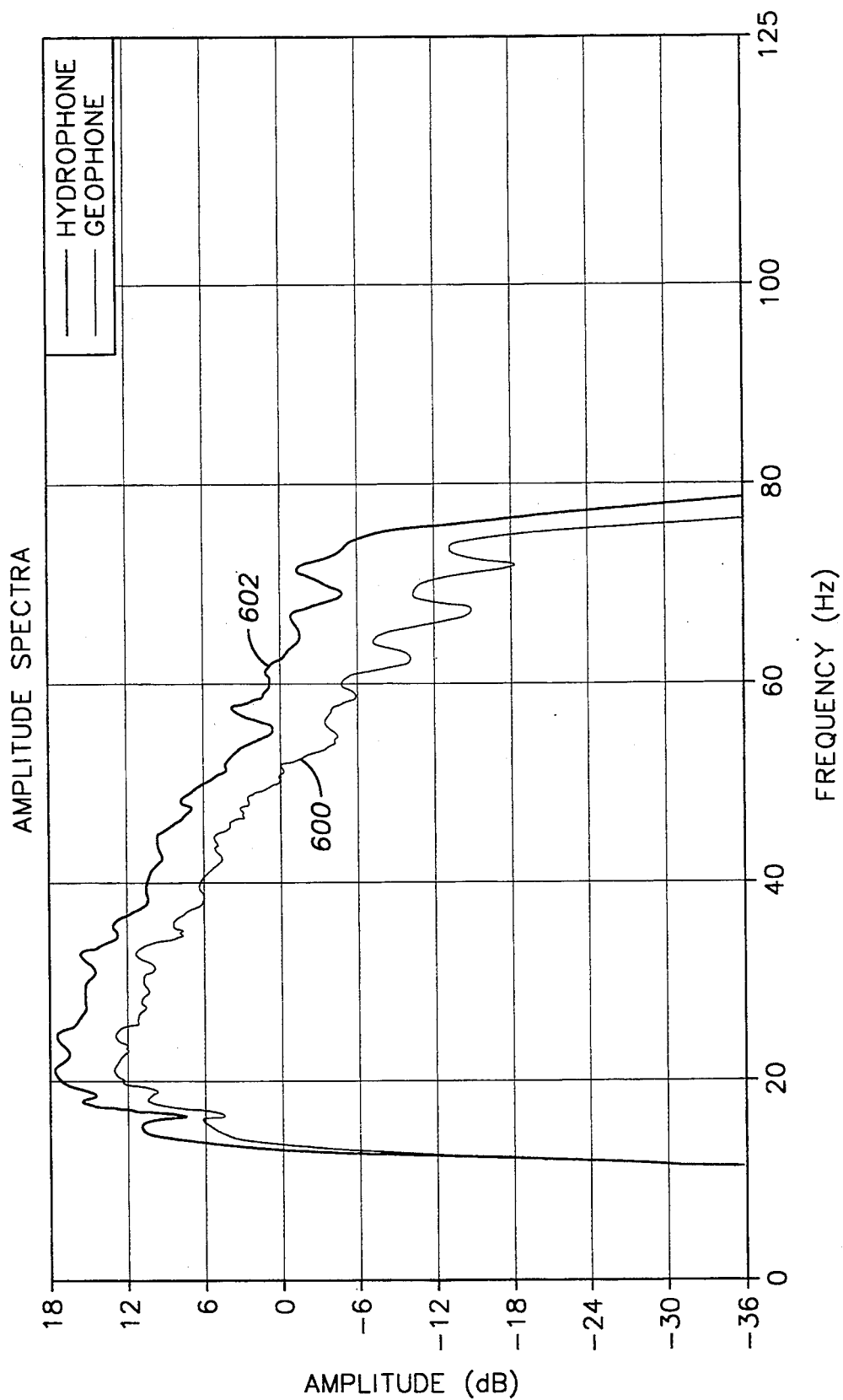
FIG. 6 is a graph illustrating the amplitude spectra of a geophone response 600 and an integrated hydrophone response 602.
Figure 7:
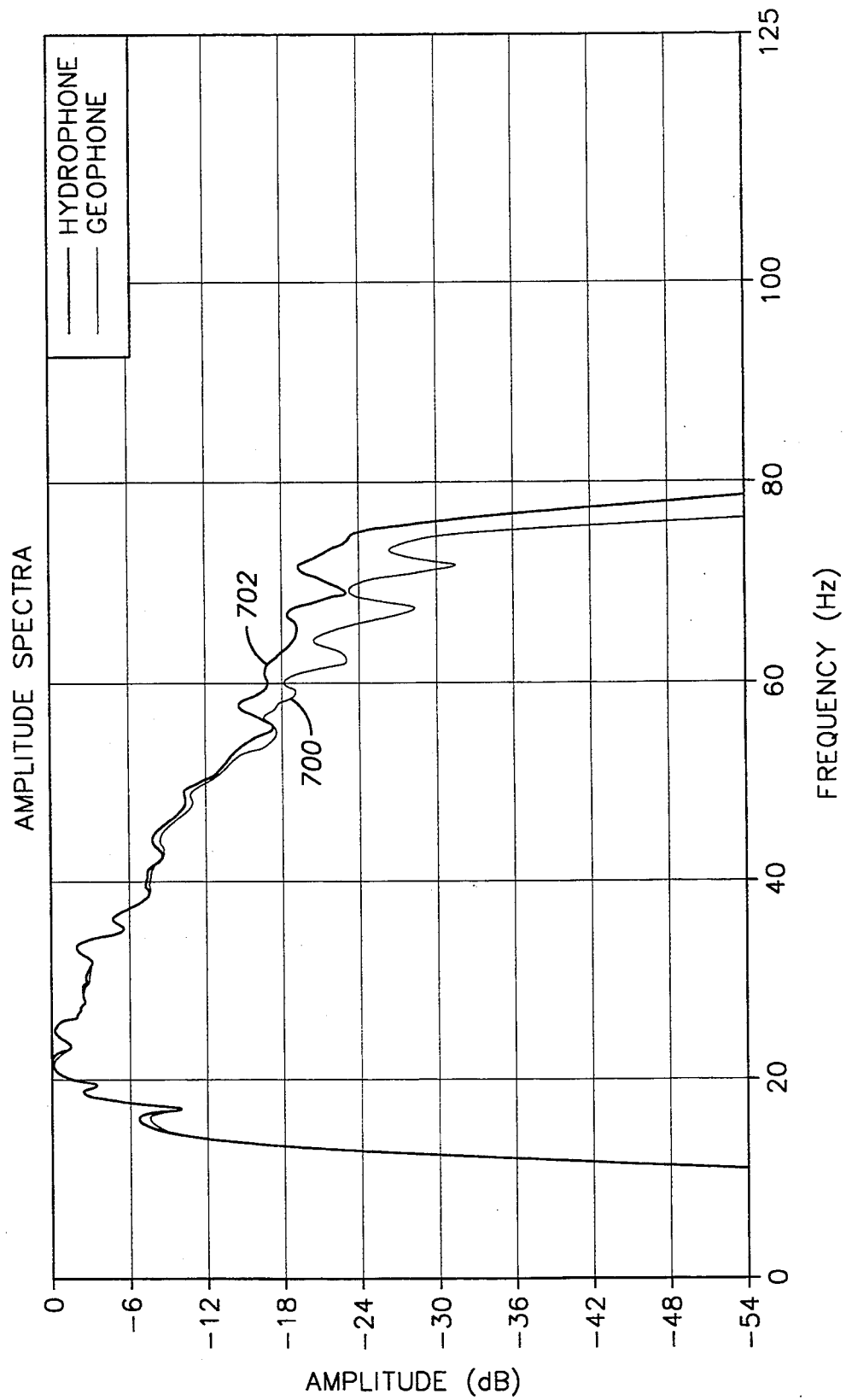
FIG. 7 is a graph illustrating the amplitude spectra of a geophone response 700 and an integrated hydrophone response 702, wherein the traces 700, 702 have been normalized to 0 dB.

FIG. 5 shows a summed and correlated geophone trace 500 and a hydrophone trace 502, which were recorded during testing. In each trace, the flexural wave noise is the dominant energy. The noise can be seen to be dispersive, since the higher frequency noise arrives in advance of the lower frequency noise. FIG. 6 shows the amplitude spectrum 600 of the geophone trace 500 and the amplitude spectrum 602 of the integrated hydrophone trace 502, without using any scale factor adjustment. FIG. 7 shows a scaled geophone spectrum 700 and a scaled, integrated hydrophone spectrum 702. The spectra 700, 702 were generated by normalizing the highest value of each trace 600, 602 to 0 dB, in effect scaling the spectra 700, 702 to each other. The two spectra 700, 702 are nearly identical between about 10 Hz and 60 Hz.

Figure 8:
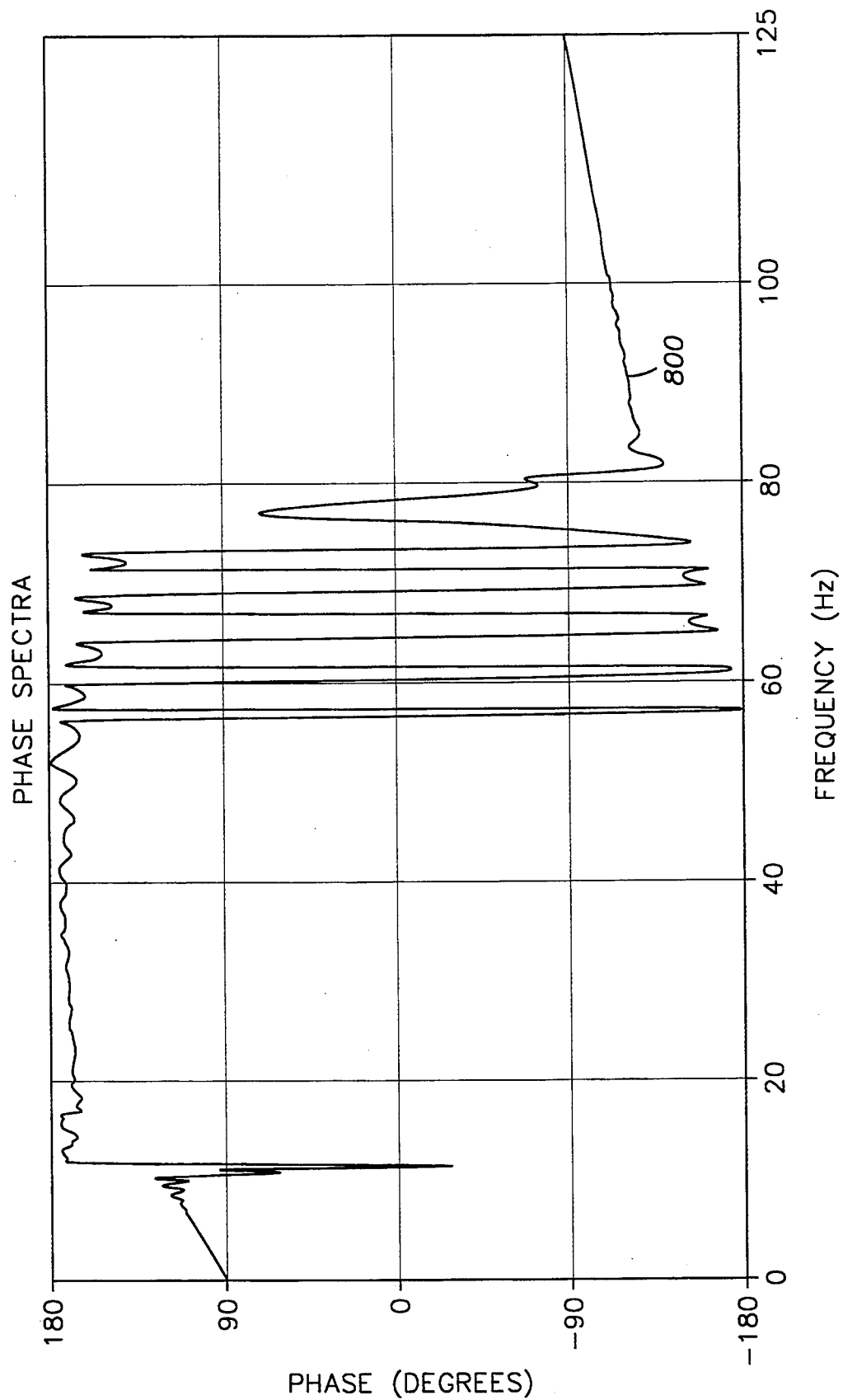
FIG. 8 is a graph illustrating a resultant phase spectrum 800 obtained by subtracting an integrated hydrophone phase spectrum from a geophone phase spectrum.

Because the energy of the flexural ice wave so dominates the geophone trace 500 and the integrated hydrophone trace 502, the phase difference would be expected to be 180°, in accordance with Equation 5. However, as shown in FIG. 8, the phase difference is about 10° less than 180°. FIG. 8 shows a resultant phase spectrum 800, obtained by subtracting the integrated hydrophone phase spectrum (not shown) from the geophone phase spectrum (not shown). If the phase mismatch is ignored, and the integrated hydrophone trace 502 is adjusted to achieve the spectral match indicated in FIG. 7, and the trace 500 is summed with the adjusted trace 502, a resultant trace 900 is obtained (FIG. 9). The flex wave noise is attenuated here by 20 dB, i.e., a factor of 10.

The result of FIG. 9 can be further improved by correcting the phase mismatch present in the traces 500, 502. If a 10° correction for all frequencies is applied to the integrated hydrophone trace 502 prior to amplitude adjustment and summing with the geophone trace 500, the time domain signal 1000 (FIG. 10) is obtained. The signal 1000 displays flex wave attenuation of nearly 40 dB, i.e., a factor of 100. Also, random noise is severely attenuated before and after the first "Klauder Wavelet," which arrives at about 160 milliseconds. This additional noise attenuation occurs because the geophone 110 and hydrophone 112 also sense random vertical motion of the floating ice sheet caused by wind, people, vehicles, and other noise.

It can be seen in FIGS. 8 and 9 that correcting the integrated hydrophone trace 502 by a constant 10 degrees for all frequencies is an approximate correction. In FIG. 8, the difference between the phase spectrum 800 and 180 degrees is not constant. And, in FIG. 9, residual flex energy still appears in the signal. Furthermore, the correction required for the other hydrophones may be different.

The primary reason for the phase mismatch between the hydrophones and the geophones is due to the fact that the test data were recorded using transformer-coupled hydrophones. Transformers are used in each hydrophone to match a hydrophone's pressure impulse response to a geophone's particle velocity impulse response.

Small manufacturing variations in the construction of the transformers or their material properties degrade the quality of the impulse response match. One problem with the use of transformers in this context is their core non-linearities at large signal levels. This causes the magnitude and phase of the signal produced by a transformer-coupled hydrophone to vary with the magnitude of the electrical output signal produced by the hydrophone. Furthermore, the natural frequency of the transformer-coupled hydrophone will also vary with the magnitude of the electrical output signal provided by the hydrophone. Therefore, although a transformer may be advantageously used to modify the output of a hydrophone to more closely match the output of a geophone at a particular output level of the hydrophone, there are some significant limitations. This problem may be alleviated by connecting the hydrophones to the seismic recording instruments through charge coupled amplifiers, as described in co-pending application Ser. No. 08/034,364, entitled "Hydrophone With Electrical Characteristics of a Geophone" filed on Mar. 19, 1993 in the name of Algernon S. Badger, and assigned to Halliburton Company.

Implementation—Structure

With the foregoing testing and theoretical analysis in mind, an illustrative method (described below) was developed and implemented in accordance with the present invention, using a data acquisition scheme shown in FIG. 11. In accordance with this scheme, a surface source 1100 generates seismic signals that propagate through a floating ice sheet 1102. In a preferred embodiment, the surface energy source 1100 may comprise multiple vibrators placed at selected locations. Alternatively, an impulsive seismic source such as an explosive device may be used. In an embodiment utilizing a vibrating source, the source 1100 is placed on top of the ice sheet 1102, which is typically 3.5 to 5 feet thick. The ice sheet 1102 should be at least 4.5 feet thick to support trucks and other machinery. The ice sheet 1102 has an upper surface 1102a and a lower surface 1102b. The ice sheet 1102 floats on water 1104, which is often about 15 feet deep. The water 1104 rests upon the surface of the earth 1106.

Multiple sets of openings 1108 are cut in the ice sheet 1102, with the geometric center of each set 1108 being preferably about 110 feet apart from the geometric center of any adjacent set 1108. Preferably, each opening in a set 1108 has a diameter of about 10 inches. Each set of openings 1108 is associated with a recording station 1109, which includes the following components: (1) multiple geophones 1110, wherein one or more geophones 1110 are placed at the top of each opening, on the upper surface 1102a of the floating ice sheet 1102, and (2) multiple hydrophones 1112, wherein one hydrophone 1112 is placed at the bottom of an opening, on the lower surface 1102b of the ice sheet 1102. Alternatively, the hydrophones 1112 may be placed in the openings; moreover, the geophones 1110 may be clamped to the floating ice sheet 1102 close to the hydrophones 1112.

In a preferred embodiment, each opening has a single geophone 1110 being firmly mounted to the floating ice sheet 1102. Alternatively, several geophones may be used at each opening. In ice having a high degree of homogeneity, it is desirable to use a spatial array of geophones and a spatial array of hydrophones at each station 1109, because homogenous ice provides a better medium for the propagation of flexural ice waves. A "spatial array" is a string of geophones or hydrophones electrically attached in an arrangement such as series or parallel connection, where the geophones are strung out from each other, rather than being positioned close to each other. Preferably, the geophone or hydrophone units in a spatial array are positioned in a line, with each hydrophone or geophone unit being about 4.5 to 9 feet from its adjacent units.

Implementation—Method

A number of illustrative methods for reducing interference from flexural ice waves are contemplated pursuant to the invention. As mentioned above, these methods may be implemented by using the data acquisition scheme of FIG. 11. A first method for eliminating flexural ice waves from seismic data includes a number of tasks 1200 (FIG. 12). After the method is started in task 1202, the energy source 1100 is used to generate a seismic wave in the ice sheet 1102 in task 1204. Then, in task 1206, the seismic disturbances created by the energy source 1100 are detected by the geophones 1110 and the hydrophones 1112.

After task 1206, task 1208 computes the trace root mean square (RMS) value of the geophone's response. The RMS value may be calculated using any of a number of well-known formulas such as the exemplary formula shown in Equation 15 (below).

$$\text{RMS} = \sqrt{\frac{1}{T} \int f^2(t) dt} \qquad [15]$$

Also after task 1206, task 1210 integrates the hydrophone's response. Then, task 1212 computes the RMS value of the integrated hydrophone's response. Task 1214 then scales the hydrophone's response by the ratio of the geophone's response to the hydrophone's response, as calculated in tasks 1208 and 1212, respectively. Task 1216 then sums the RMS value of the geophone signal with the scaled integrated hydrophone response, and task 1218 scales the summed trace by halving it. The method of FIG. 12 ends in task 1220.

As an alternative to tasks 1208, 1212, and 1214, other methods may be utilized to match the amplitudes of the geophone and hydrophone responses. For example, instead of scaling the integrated hydrophone signal by the ratio of the geophone response to the hydrophone's response, the geophone signal may be scaled by the ratio of the integrated hydrophone response to the geophone response. In addition, other known methods may be used to scale the geophone and/or the integrated hydrophone signal so that their maximum amplitudes are substantially equal.

Figure 13:
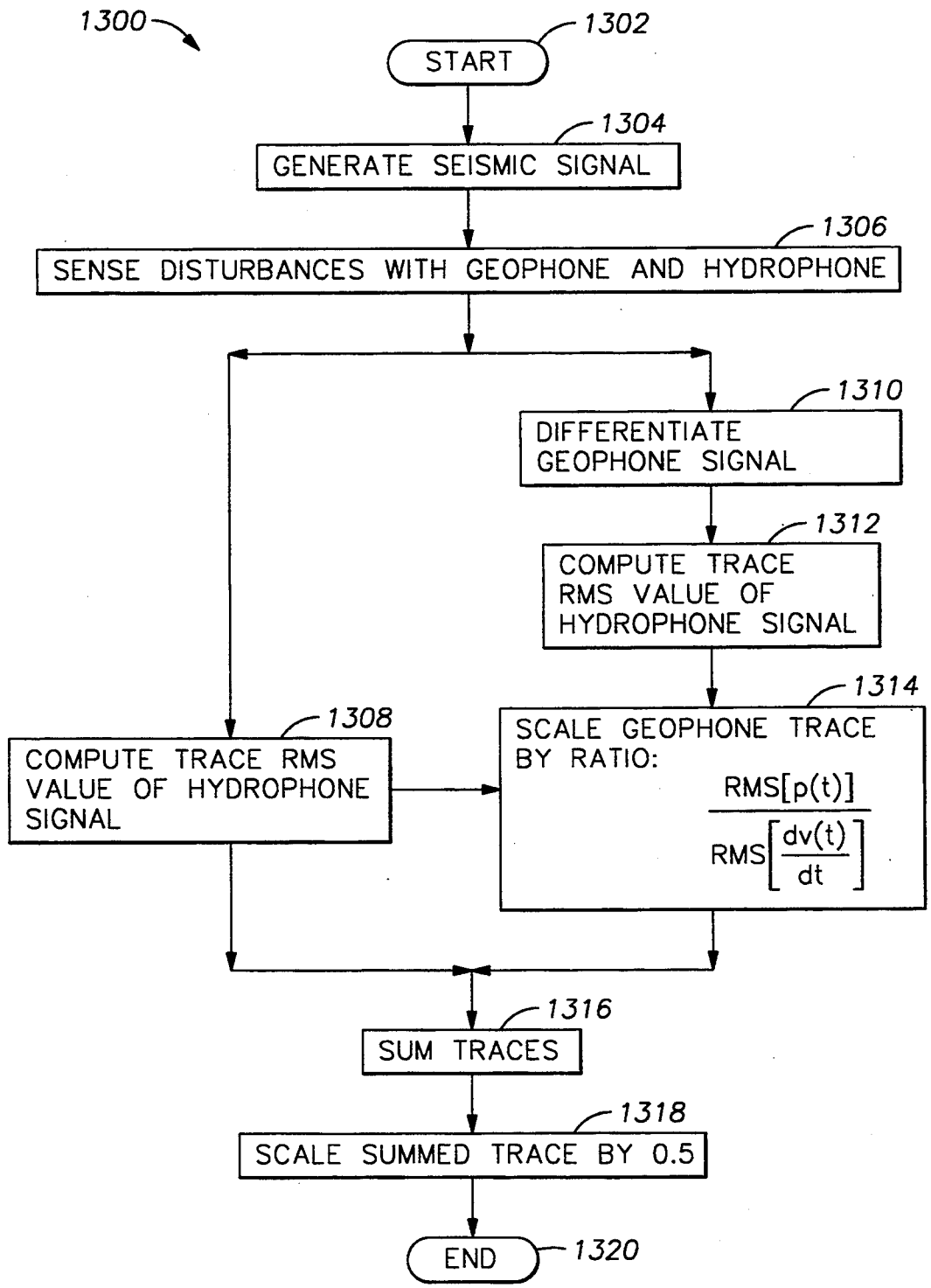
FIG. 13 is a flowchart illustrating a second method for eliminating flexural ice waves from seismic data in accordance with the invention.

A second method for eliminating flexural ice waves from seismic data utilizes a number of tasks 1300 (FIG. 13). Instead of integrating the hydrophone signal, this method differentiates the geophone signal. After the method is started in task 1302, the energy source 1100 is used to generate a seismic wave in the ice sheet 1102 in task 1304. Then, in task 1306, the seismic disturbances created by the energy source 1100 are detected by the geophones 1110 and the hydrophones 1112.

After task 1306, task 1308 computes the RMS value of the hydrophone response using a formula such as Equation 15 (above). Also, after task 1306, task 1310 differentiates the geophone response, and task 1312 computes the RMS value of the differentiated geophone response. Task 1314 then scales the differentiated geophone response by the ratio of the hydrophone response to the differentiated geophone response, as calculated in tasks 1308 and 1312, respectively. Task 1316 then sums the RMS value of the hydrophone signal with the scaled differentiated geophone response, and task 1318 scales the summed trace by halving it. The method of FIG. 13 ends in task 1320.

As with the method of FIG. 12, other methods may be utilized in FIG. 13 to match the amplitudes of the geophone and hydrophone responses, e.g. scaling the hydrophone response by the ratio of the RMS of the differentiated geophone response to the RMS of the hydrophone response. Furthermore, instead of using geophones, one or more accelerometers may be employed, thereby obviating the need for task 1310.

Still another method is contemplated by the present invention for obtaining seismic data without interference from flexural ice waves. This method (FIG. 14) additionally functions to eliminate any phase error that might be introduced through, for example, the use of a transformer to modify the hydrophone response. The method of FIG. 14 includes a number of tasks 1400, which are initiated in task 1402. After task 1402, the energy source 1100 is used in task 1404 to generate a seismic signal in the floating ice sheet 1102. Then, in task 1406, the seismic disturbances created by the energy source 1100 are detected by the geophones 1110 and the hydrophones 1112.

After task 1406, task 1408 establishes a window that includes the flexural ice wave, and modifies the geophone trace by setting the geophone trace to zero outside the window. Then, in task 1410, a Fast Fourier Transform (FFT) operation is performed on the modified geophone trace to produce a geophone phase spectrum. Also occurring after task 1406 is task 1412, which computes the RMS value of the geophone signal. Another task that occurs after task 1406 is task 1414, which functions to modify the hydrophone trace by setting the hydrophone trace to zero outside the window. After task 1414, task 1416 performs an FFT operation on the modified hydrophone trace to produce a hydrophone phase spectrum. In task 1418, the hydrophone phase spectrum is reduced by 90°. Then, task 1419 reduces the geophone phase spectrum (of task 1410) by the reduced hydrophone phase spectrum (of task 1418) to produce a spectral phase difference. This spectral phase difference is averaged or smoothed in task 1420. In an exemplary embodiment, the smoothing of task 1420 is performed using a 10 Hz wide, equal coefficient filter. Then, task 1422 computes the difference between the smoothed or averaged signal and 180°.

In task 1424, an FFT operation is performed on the original hydrophone signal to produce a hydrophone amplitude spectrum and phase spectrum. In task 1430, the hydrophone amplitude spectrum signal is integrated by dividing each spectral value by w=2πf. In task 1425, the hydrophone phase spectrum is integrated by subtracting 90°. In task 1426, a corrected hydrophone phase spectrum is generated by reducing the integrated hydrophone phase spectrum from task 1425 by the signal from task 1422. In task 1428, an inverse FFT operation is performed upon the integrated hydrophone amplitude spectrum from task 1430 and the corrected hydrophone phase spectrum from task 1426, to create a time domain hydrophone signal.

After task 1428, task 1432 computes the RMS value of the time domain hydrophone signal within the window. Then, task 1434 scales the signal from task 1432 by the ratio of the RMS value of the geophone signal from task 1412 to the RMS value of the time domain hydrophone signal from task 1432. Task 1436 sums the traces from tasks 1412 and 1434, and then task 1438 scales the summed trace by halving it. The routine then ends in task 1440.

As an alternative to tasks 1412, 1432, and 1434, other methods may be utilized to match the amplitudes of the geophone and hydrophone responses. For example, instead of scaling the modified hydrophone signal by the ratio of the geophone response to the integral of the hydrophone response, the geophone signal may be scaled by the ratio of the integral of the hydrophone response to the geophone response. In addition, other methods are available to scale the geophone and/or the integrated hydrophone signal so that their maximum amplitudes are substantially equal. For example, average absolute values could be employed.

Figure 15:
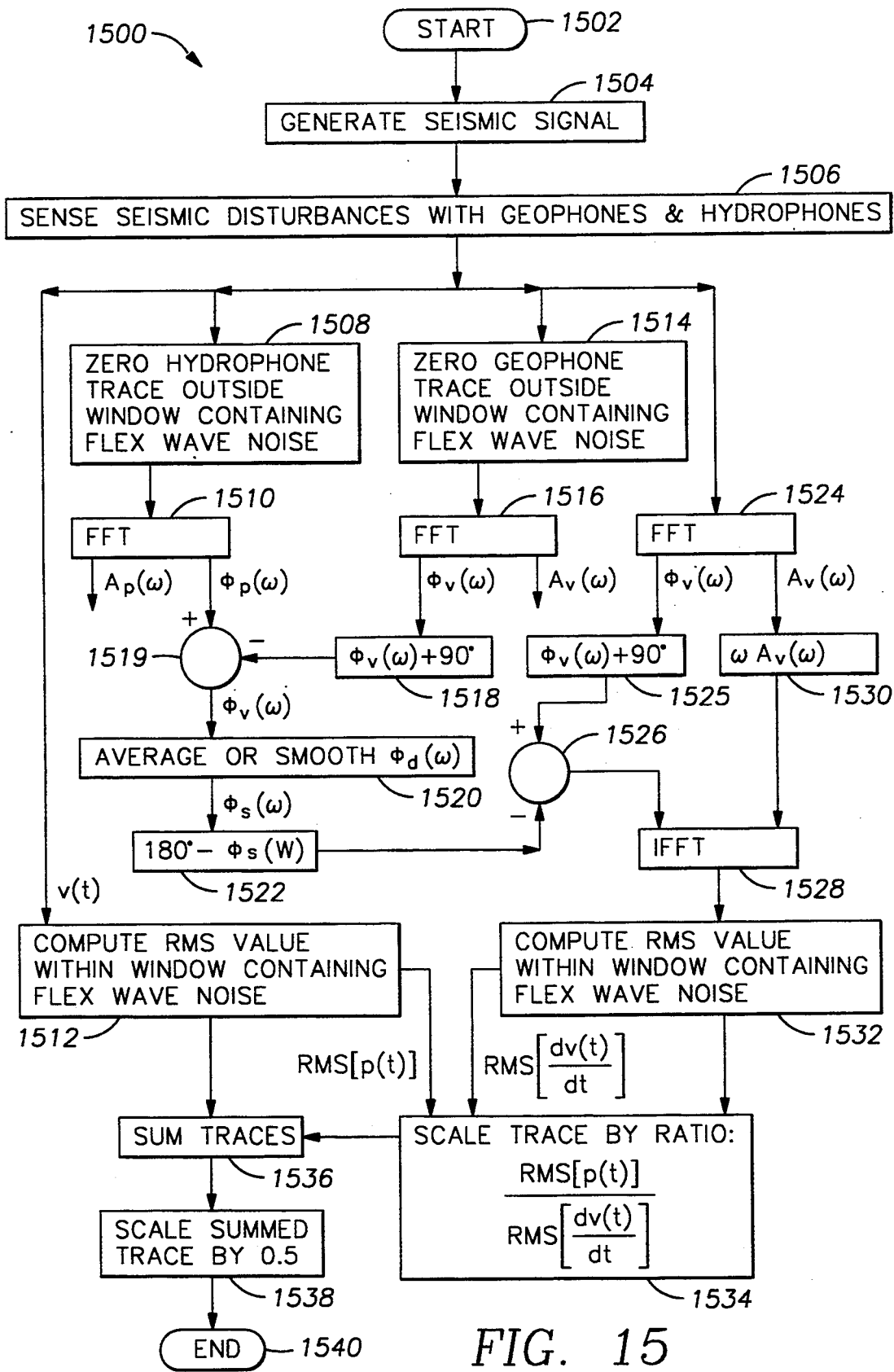
FIG. 15 is a flowchart illustrating still another method for eliminating flexural ice waves and phase error from seismic data, in accordance with the invention.

FIG. 15 illustrates a further method for obtaining seismic data without interference from flexural ice waves, and eliminating phase error. The method of FIG. 15 includes a number of tasks 1500, which are initiated in task 1502. After task 1502, the energy source 1100 is used in task 1504 to generate a seismic signal in the floating ice sheet 1102. Then, in task 1506, the seismic disturbances created by the energy source 1100 are detected by the geophones 1110 and the hydrophones 1112.

After task 1506, task 1508 establishes a window that includes the flexural ice wave, and modifies the hydrophone trace by setting the hydrophone trace to zero outside the window. Then, in task 1510, a Fast Fourier Transform (FFT) operation is performed on the modified hydrophone trace to produce a hydrophone phase spectrum. Also occurring after task 1506 is task 1512, which computes the RMS value of the hydrophone signal. Another task that occurs after task 1506 is task 1514, which functions to modify the geophone trace by setting the geophone trace to zero outside the window. After task 1514, task 1516 performs an FFT operation on the modified geophone trace to produce a geophone phase spectrum. In task 1518, the geophone phase spectrum is increased by 90°. Then, task 1519 reduces the hydrophone phase spectrum (of task 1510) by the increased geophone phase spectrum (of task 1518) to produce a spectral phase difference. This spectral phase difference is averaged or smoothed in task 1520. Then, task 1522 computes the difference between the smoothed or averaged signal and 180°.

In task 1524, an FFT operation is performed on the original geophone signal to produce a geophone amplitude spectrum and a geophone phase spectrum. In task 1530, the geophone amplitude spectrum signal is differentiated by multiplying each spectral value by w=2πf. In task 1525, the geophone phase spectrum is differentiated by adding 90°. In task 1526, a corrected geophone phase spectrum is generated by reducing the differentiated geophone phase spectrum from task 1525 by the signal from task 1522. In task 1528, an inverse FFT operation is performed upon the differentiated geophone amplitude spectrum from task 1530 and the corrected geophone phase spectrum from task 1526, to create a time domain geophone signal.

After task 1528, task 1532 computes the RMS value of the time domain geophone signal within the window. Then, task 1534 scales the signal from task 1532 by the ratio of the RMS value of the hydrophone signal (from task 1512) to the RMS value of the time domain geophone signal (from task 1532). Task 1536 sums the traces from tasks 1512 and 1534, and then task 1538 scales the summed trace by halving it. The routine then ends in task 1540. The routine of FIG. 15, like that of FIG. 14, may be modified by using other methods to match the amplitudes of the geophone and hydrophone responses, as discussed above.

Testing

Figure 11:
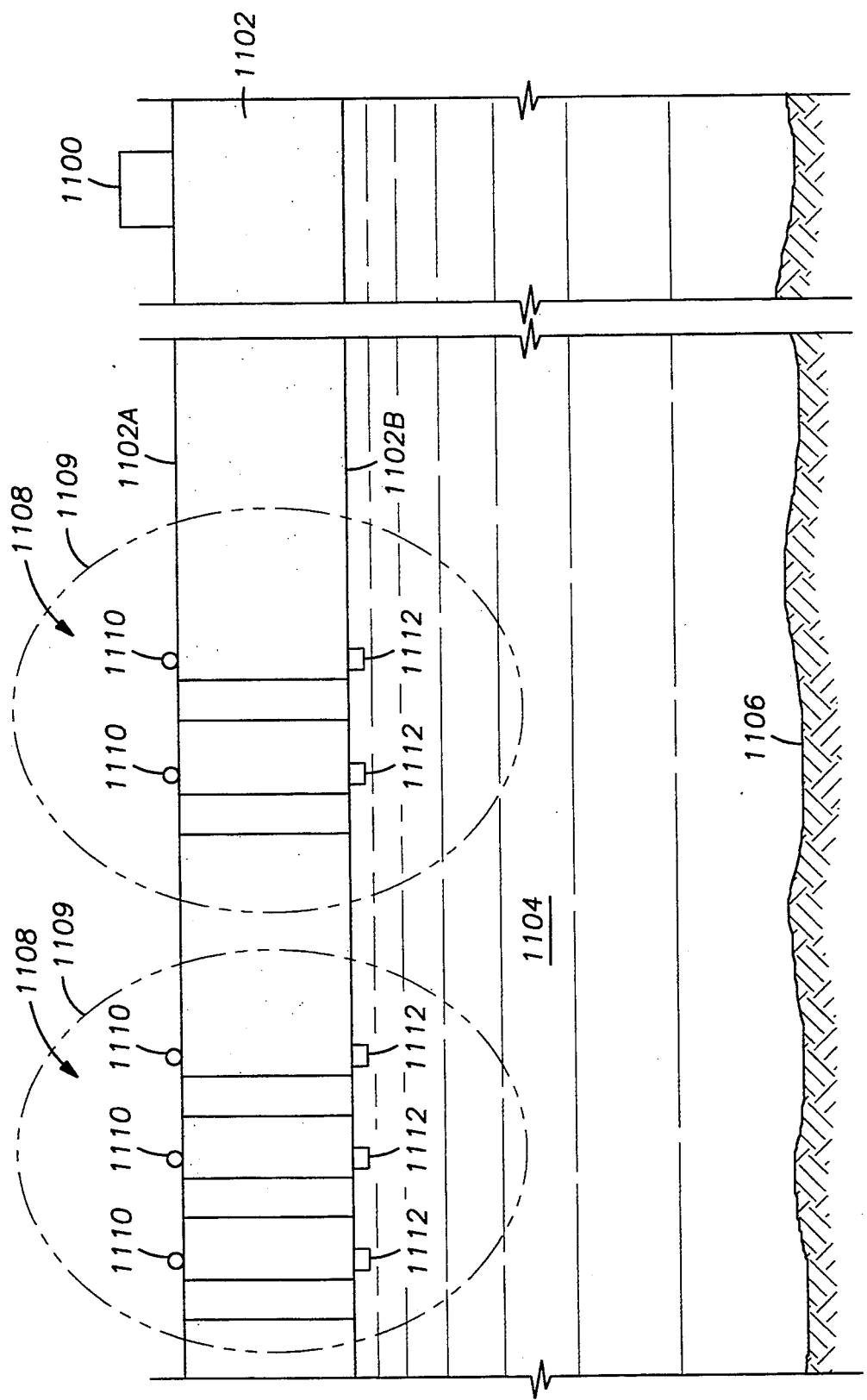
FIG. 11 is a cut-away side view of an illustrative data acquisition scheme in accordance with the invention.
Figure 12:
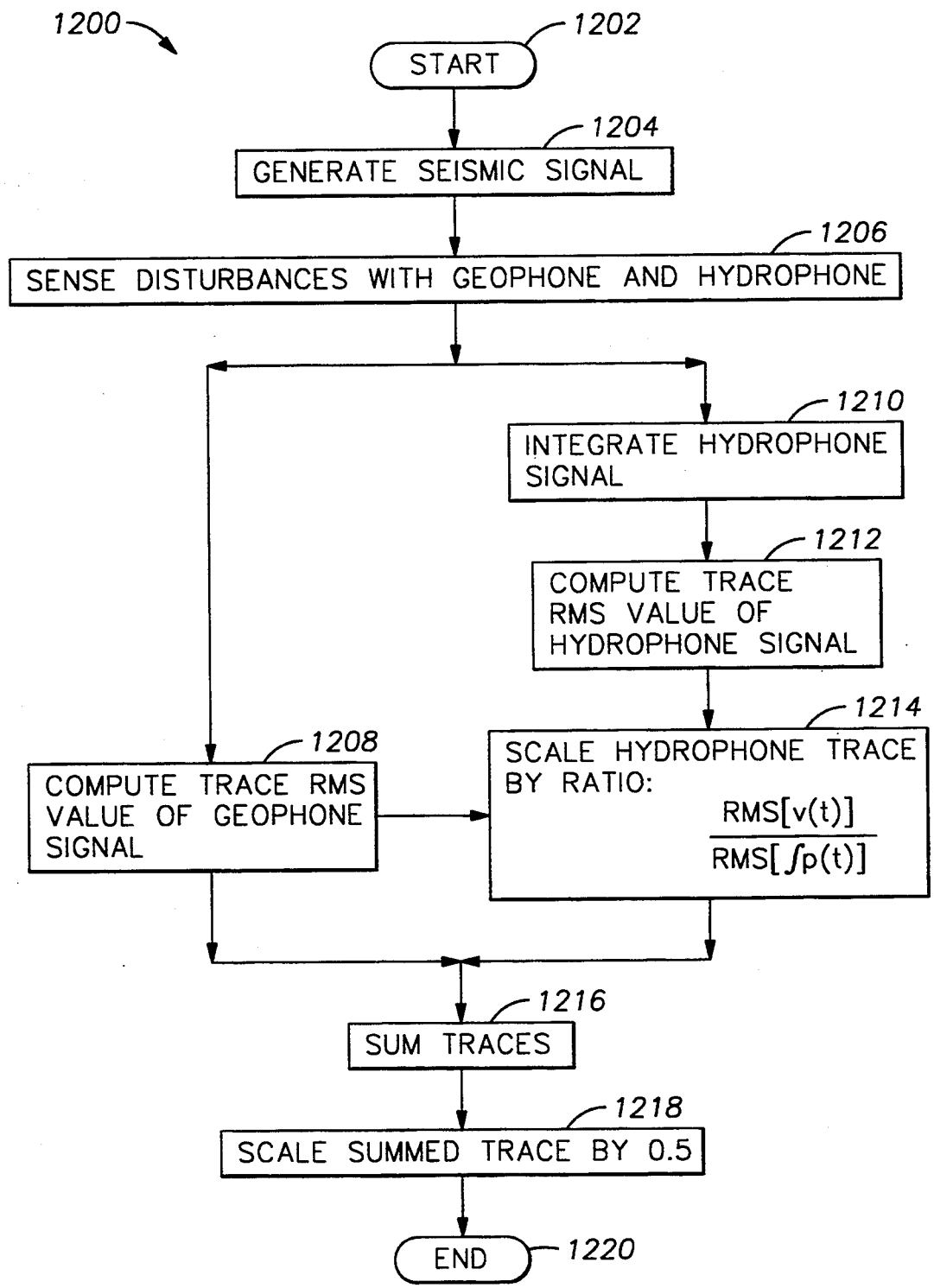
FIG. 12 is a flowchart illustrating a first method for eliminating flexural ice waves from seismic data in accordance with the invention.

The hardware arrangement of FIG. 11 was utilized to implement the method of the invention, with the results depicted in FIGS. 3–10. Eight different stations 1109 were used. Multiple vibrating seismic sources 1100 were used, with the sources 1100 being positioned in a line extending outward from the stations 1109. The sources 1109 were spaced apart by 110 foot increments. The seismic sources 1100 were utilized to simultaneously generate four successive signal "sweeps," each sweep comprising a five-second linear ramp from 10 Hz to 80 Hz. For each sweep, the responses of all hydrophones at each station 1109 were summed, and the responses of all geophones at each station 1109 were summed. If each set of four sweeps is considered a "data point," 100 data points were taken, with the sources 1100 being moved 110 feet farther from the stations 1109 between each successive data point. At the first data point, the nearest source 1100 to the stations 1109 was about 110 feet away. Thus, the source-to-station distance ranged from 110 to 11,000 feet while the data points were taken.

Linear Adaptive Filter

Figure 16:
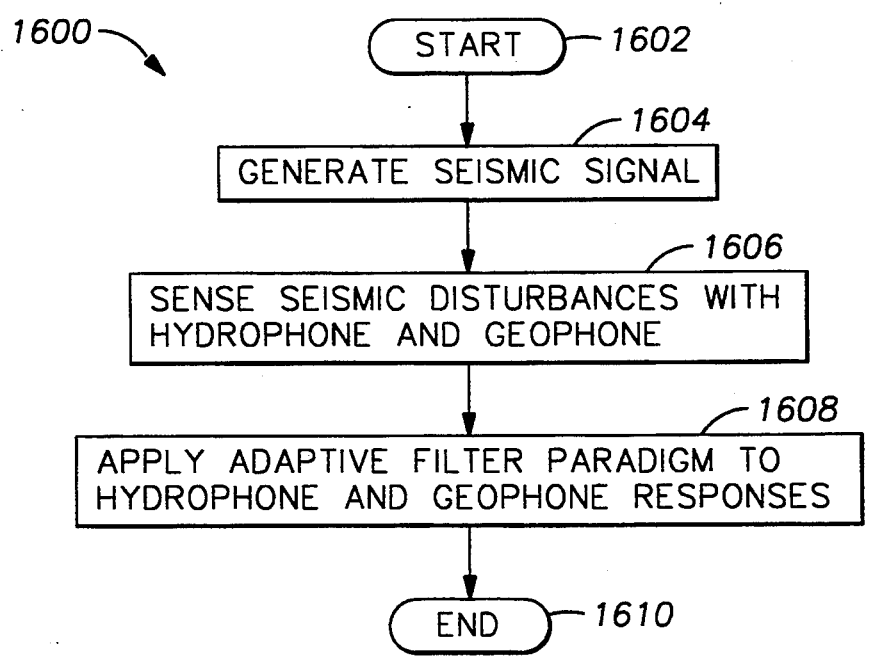
FIG. 16 is a flowchart illustrating steps performed to eliminate flexural ice waves from seismic data using a linear adaptive filter, in accordance with the invention.

An alternative embodiment of the invention is contemplated using a linear adaptive filter to eliminate flexural ice waves from a seismic signal. This method includes a number of tasks 1600, (FIG. 16). After the method is started in task 1602, the energy source 1100 is used to generate a seismic wave in the ice sheet 1102 in task 1604. Then, in task 1606, the seismic disturbances created by the energy source 1100 are detected by the geophones 1110 and the hydrophones 1112.

Then, as described in greater detail below, a linear adaptive filter model is applied to the responses of the geophones 1110 and the hydrophone 1112 in task 1608. This frees the hydrophone response from most noise that is uncorrelated with that response. In other words, task 1608 reduces noise that might be caused by flexural ice waves, wind blowing on the ice 1102, vehicles driving on the ice 1102, or other sources uncorrelated with the seismic signal produced by the energy source 1100. After the noise-reduced signal is obtained, the routine ends in task 1610.

Figure 17:
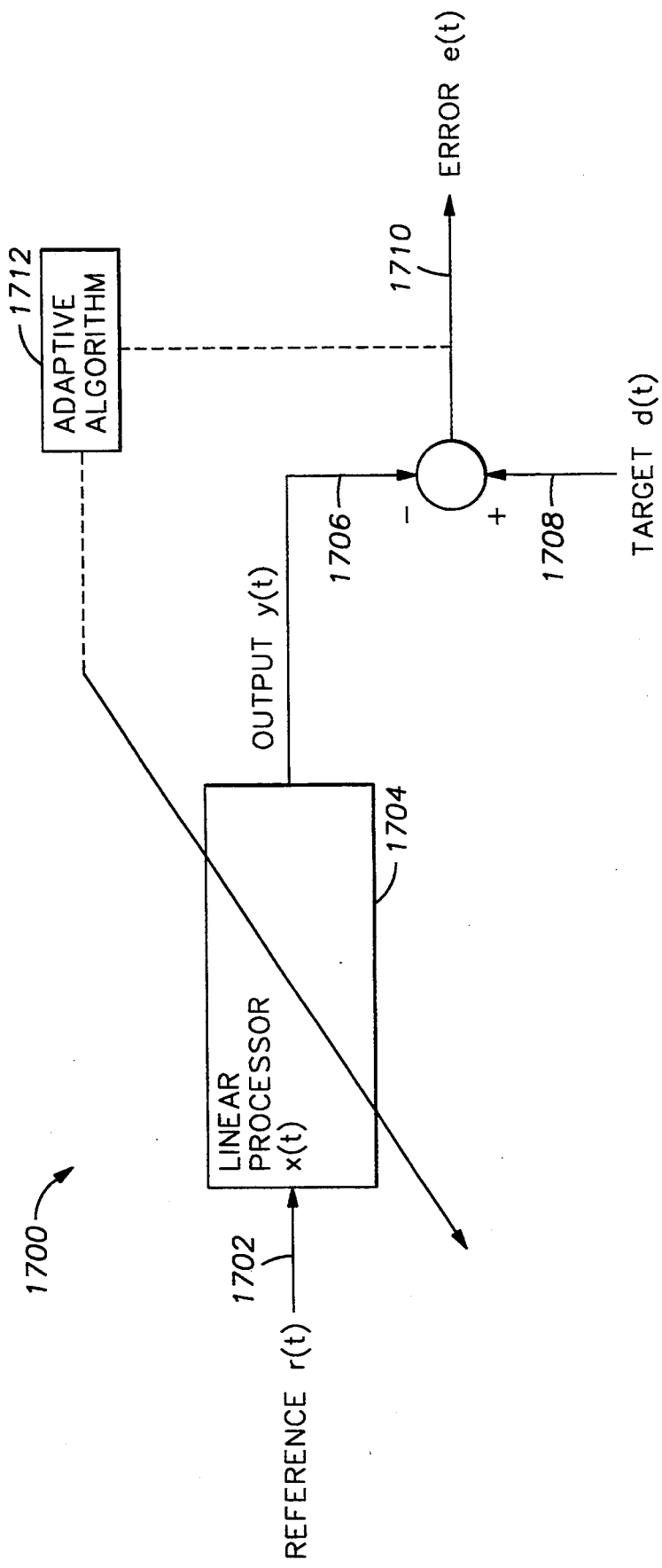
FIG. 17 is a diagram illustrating how a typical linear adaptive filter operates.

FIG. 17 shows a model 1700 of a typical linear adaptive filter. The input signal, which is called a reference signal 1702, is directed to a linear processor filter 1704 having a given impulse response. The linear processor filter 1704 may comprise a finite impulse response (FIR) filter, or any of a number of well-known methods. The linear processor filter 1704 modifies the reference signal 1702 in response to the adaptive filter algorithm 1712 to provide a filter output signal 1706, which is usually considered to be the ultimate output of the system. The filter output signal 1706 is subtracted from a desired output signal, called a "target signal" 1708, to produce a system error signal 1710.

Mathematically, the above-described arrangement may be expressed by Equations 16 and 17 (below).

$$e(t) = d(t) - y(t) \quad [16]$$

$$y(t) = r(t) * x(t), \quad [17]$$

where:
- r(t) is the reference signal 1702;
- x(t) represents the impulse response of the linear processor filter 1704;
- y(t) represents the filter output signal 1706;
- d(t) represents the target signal 1708;
- e(t) represents the system error signal 1710; and
- "*" denotes a convolution operation.

The adaptive filter algorithm 1712 attempts to minimize the system error signal 1710 by adjusting the impulse response of the linear processor filter 1704. When the error signal 1710 is minimized, the filter output signal 1706 is nearest to the target signal 1708, and the goal of the model 1700 has been achieved.

Many adaptive filter algorithms employ methods to minimize the error signal using a least mean squares approach. In vector notation, this is accomplished according to Equation 18 (below).

$$\epsilon = e^T e = (d - r*x)^T (d - r*x) \quad [18]$$

where:
- $\epsilon$ is a scalar quantity,
- T represents a transposition operation; and
- e, d, r, and x are vector quantities.

This equation may be solved with a variety of well known direct or iterative methods. With iterative methods, the adaptive filter algorithm 1712 operates, in response to the system error signal 1710, to advance the linear processor filter 1704 through a series of steps in which the filter processor 1704 gradually achieves the output signal 1706 that minimizes the error signal 1710. With direct methods, the adaptive filter algorithm 1712 operates by solving linear equations, as explained in more detail in *Adaptive Signal Processing* by Widrow & Stearns, pp. 3-192, as well as *Adaptive Filter Theory* by Haydin, pp. 273-444. A number of different filter processors and adaptive filter algorithms are also described in these materials, which are hereby incorporated by reference into this application.

Figure 18:
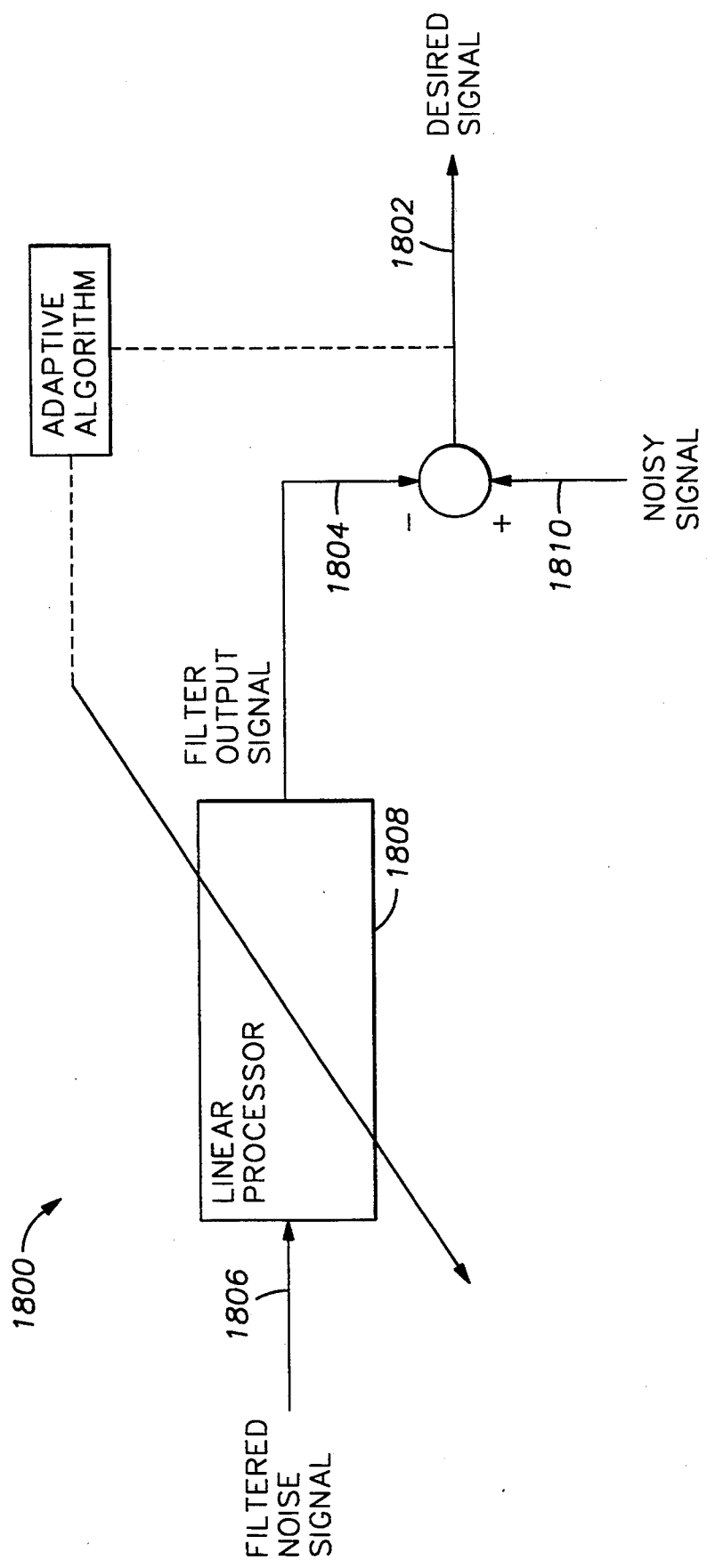
FIG. 18 is a diagram illustrating how a linear adaptive filter may be applied to cancel noise.

One known implementation 1800 of the linear adaptive filter, known as the "noise cancellation paradigm" (FIG. 18), is used to reduce noise from a desired signal. With this model, the error signal 1802 is the desired output, rather than the filter output signal 1804. In particular, a reference signal 1806 comprises a filtered noise signal. The linear processor 1808 comprises a convolver, such that the output 1804 comprises a processed noise signal. The target signal 1810 in this application comprises a noisy signal, i.e., the desired signal with unfiltered noise also present. Therefore, the error signal 1802 in this case comprises the desired signal, which is virtually free from noise.

Figure 19:
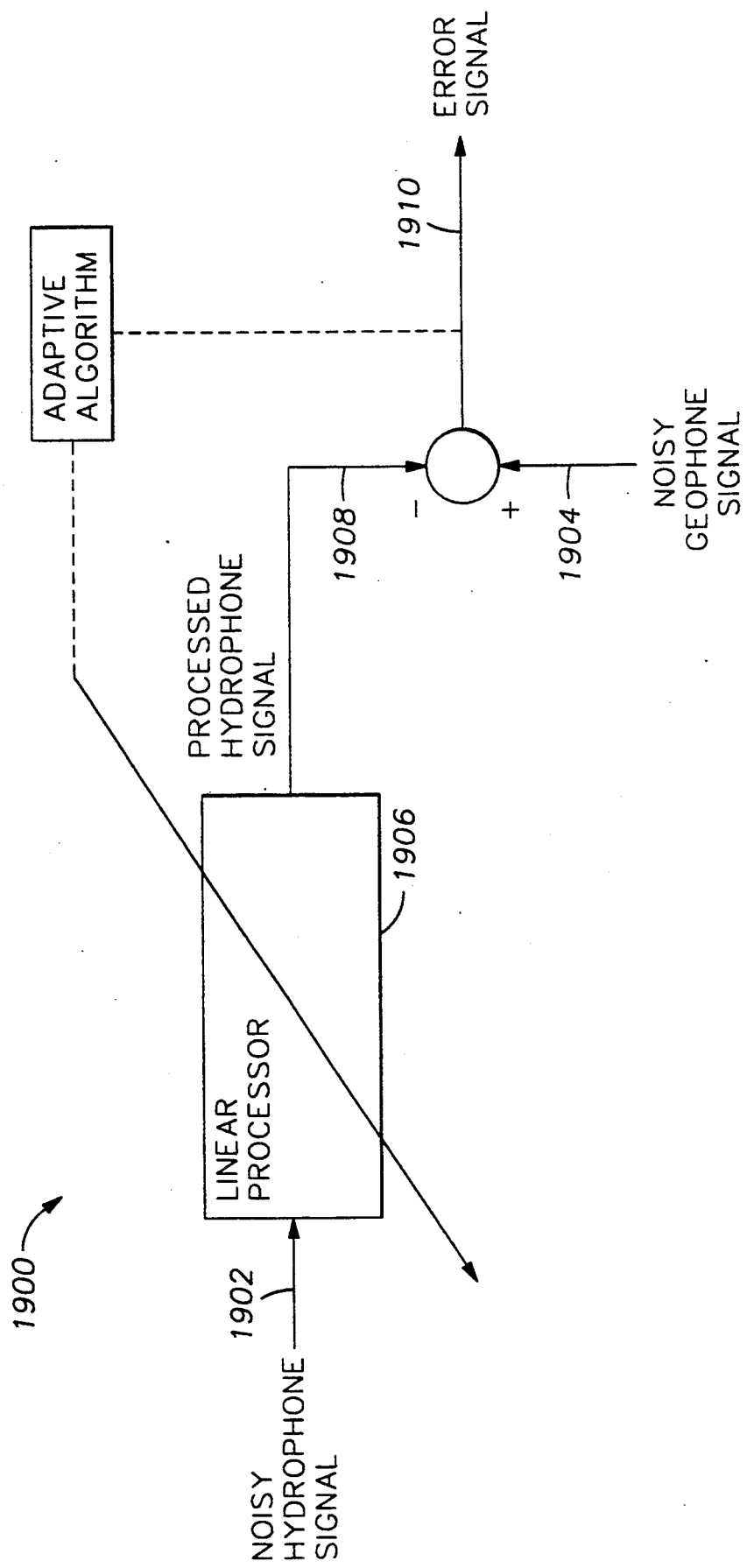
FIG. 19 is a diagram illustrating how a linear adaptive filter may be employed to eliminate flexural ice waves from seismic data in accordance with the invention.

The present invention differs from the typical noise reducing linear adaptive filter 1800, where the reference signal 1806 and target signal 1810 comprise a filtered noise signal and a noisy signal, respectively. Specifically, the present invention utilizes hydrophone and geophone responses as the reference and target signals, respectively, to obtain a virtually noise-free signal. As shown in FIG. 19, a linear adaptive filter 1900 constructed in accordance with the present invention utilizes a noisy hydrophone signal 1902 instead of a reference signal. The noisy hydrophone signal may comprise, for example, the response of the hydrophone 1110. In accordance with the invention, a geophone signal 1904 is input instead of a target signal. A linear processor 1906 includes an impulse response for calculating the integral of the hydrophone signal 1902 and multiplying the integral by a negative constant, to produce a processed hydrophone signal 1908.

The geophone signal 1904 is representative of the sum of the seismic signal and the noise (e.g., flexural ice wave) signal. However, with the hydrophone signal, the seismic signal and the noise signal are subtractive rather than additive. This is due to the physical nature of the ice motion and the detectors, as described earlier. As explained above in conjunction with Equation 5, the response of the hydrophone 1112 is equal, but opposite in polarity, to the derivative of the response of the geophone 1110 times a constant. Therefore, if the geophone signal 1904 is considered to be $S+N$ (the seismic signal added to the noise signal), then the hydrophone signal 1902 will be $d(S-N)/dt$. And, since the filter processor 1906 integrates the hydrophone signal 1902 and multiples it by a negative constant, the processed hydrophone signal 1908 represents the opposite of the seismic signal added to the noise, i.e. $-S+N$. Therefore, subtracting the processed hydrophone signal 1908 from the geophone signal 1904 yields an error signal 1910 that approaches 2.S, i.e., a doubled noise free seismic signal.

Conclusion

The present invention provides its users with a number of advantages. First of all, the invention strongly attenuates flexural ice waves present in seismic data, while enhancing the weak reflections that propagate vertically out of the earth into the overlying water and floating ice sheet. Use of methods embodying the invention have been observed to provide 30 to 40 dB of flexural wave noise attenuation. in addition to any attenuation provided by the use of processing techniques and/or source and receiver spatial arrays.

Another benefit of the invention is that it is not limited to eliminating interference caused by flexural ice waves. The invention is also useful to eliminate noise from other disturbances of the ice. For example, the invention may be effectively used to eliminate movement of the ice caused by trucks driving on the ice, wind blowing against the ice, and other noise that is unconducted with the seismic signal.

While there have been shown what are presently considered to be preferred embodiments of the invention, it will be apparent to those skilled in the art that various changes and modifications can be made herein without departing from the scope of the invention as defined by the appended claims. For instance, the method of FIG. 14 may be modified if the match between the geophone amplitude spectra and integrated hydrophone trace were not expected to be as close as that of FIG. 7. Specifically, the amplitude spectrum of the integrated hydrophone trace may be modified to better match the amplitude spectrum of the geophone trace prior to the task 1428, through cross-equalization or other known techniques. Or, the amplitude spectrum of the entire geophone trace may be substituted for the hydrophone spectrum prior to task 1428. Specifically, the inverse FFT of task 1428 may be performed on the corrected hydrophone phase spectrum of task 1426 along with the geophone amplitude spectrum (e.g., from the FFT of task 1410). Likewise, prior to task 1528 (FIG. 15), the amplitude spectrum of the differentiated geophone trace may be modified to better match the amplitude spectrum of the hydrophone trace by similar methods. For example, the inverse FFT of task 1528 may be performed on the corrected geophone phase spectrum of task 1526 along with hydrophone amplitude spectrum (e.g., from the FFT of task 1510).

Figure 14:
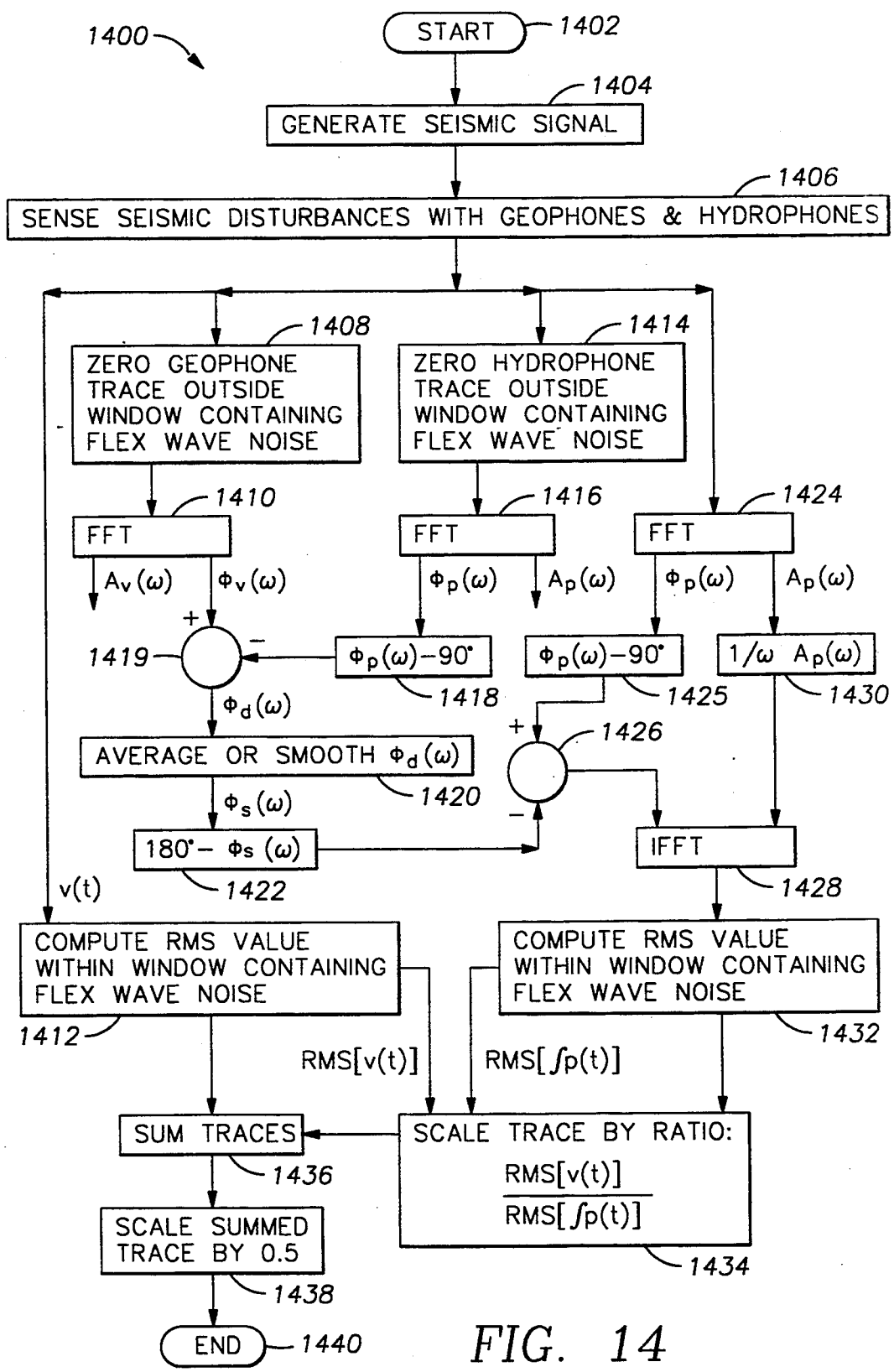
FIG. 14 is a flowchart illustrating another method for eliminating flexural ice waves from seismic data, and also for eliminating phase error that might be introduced through, for example, the use of a transformer in conjunction with the hydrophone, in accordance with the invention.

It is also contemplated that the flow diagrams of FIGS. 14 and 15, and variations such as those discussed above, can be applied to each pair of traces recorded at each station, or a single correction filter can be derived for each receiver station and applied to all the recorded data on a receiver-consistent basis.

Additionally, the physical deployment of the geophones and hydrophones may consist of individual geophone(s) and hydrophone(s) for each recording station, or spatial arrays of each. Spatial arrays have the advantage of attenuating the flexural ice wave by an additional 15 to 20 dB. If a spatial receiver array is used, particularly in conjunction with an energy source array, additional steps are contemplated to better match the responses of the hydrophones and geophones to the flex wave. Specifically, a record would be made for each receiver station with a single surface energy source offset perpendicularly from that receiver station. This offset would be enough that the resulting flex wave would arrive at each geophone/hydrophone pair of the spatial array at essentially the same instant of time. The resulting record for each station would then be used to derive the amplitude and phase spectrum correction for that station and applied to all the production data recorded by that station.

What is claimed is:

1. A method of obtaining seismic data in regions where ice covers water, comprising the steps of:
   (a) using an energy source to generate a seismic wave in the ice;
   (b) sensing seismic disturbances initiated by the energy source with a hydrophone and a geophone to produce a hydrophone signal and a geophone signal, respectively;
   (c) integrating the hydrophone signal to produce an integrated hydrophone signal; and
   (d) providing a reduced noise signal by scaling and summing the integrated hydrophone signal and the geophone signal.

2. The method of claim 1, where steps (c) and (d) are performed by applying a linear adaptive filter to the hydrophone and geophone signals.

3. The method of claim 1, wherein step (d) comprises the steps of:
   (1) scaling the integrated hydrophone signal so that its maximum amplitude is substantially equal to the maximum amplitude of the geophone signal; and
   (2) summing the scaled integrated hydrophone signal with the geophone signal.

4. The method of claim 3, wherein step (1) comprises the steps of:
   i) determining the root mean square value of the geophone signal;
   ii) determining the root mean square of the integrated hydrophone signal;
   iii) multiplying the integrated hydrophone signal by the root mean square of the geophone signal; and
   iv) dividing the product of step (iii) by the root mean square of the integrated hydrophone signal.

5. The method of claim 1, wherein step (d) comprises the steps of:
   (1) scaling the geophone signal so that its maximum amplitude is substantially equal to the maximum amplitude of the integrated hydrophone signal; and (2) summing the scaled geophone signal with the integrated hydrophone signal.

6. The method of claim 5, wherein step (1) comprises the steps of:
   i) determining the root mean square value of the geophone signal;
   ii) determining the root mean square of the integrated hydrophone signal;
   iii) multiplying the geophone signal by the root mean square of the integrated hydrophone signal; and
   iv) dividing the product of step (iii) by the root mean square of the geophone signal.

7. The method of claim 1, further comprising the step of reducing the reduced noise signal by half.

8. The method of claim 1, wherein the energy source comprises a vibrating energy source.

9. The method of claim 1, wherein the energy source comprises an impulse energy source.

10. The method of claim 1, wherein the energy source is positioned above the ice.

11. The method of claim 1, wherein the energy source is positioned below the ice.

12. The method of claim 1, wherein the energy source is positioned within the ice.

13. The method of claim 1, wherein step (b) further comprises steps of applying phase correction to the hydrophone signal.

14. The method of claim 1, wherein step (b) further comprises steps of applying phase correction to the geophone signal.

15. A method of obtaining seismic data in regions where ice covers water, comprising the steps of:
   (a) using an energy source to generate a seismic wave in the ice;
   (b) sensing seismic disturbances initiated by the energy source with a hydrophone and a geophone to produce a hydrophone signal and a geophone signal, respectively;
   (c) differentiating the geophone output signal to produce a differentiated geophone signal; and
   (d) producing a reduced noise signal by scaling and summing the differentiated geophone signal and the hydrophone signal.

16. The method of claim 15, wherein steps (c) and (d) are performed by applying a linear adaptive filter to the hydrophone and geophone signals.

17. The method of claim 15, wherein step (d) comprises the steps of:
   (1) scaling the differentiated geophone signal so that its maximum amplitude is substantially equal to the maximum amplitude of the hydrophone signal; and
   (2) summing the scaled differentiated geophone signal with the hydrophone signal.

18. The method of claim 17, wherein step (1) comprises the steps of:
   i) determining the root mean square value of the hydrophone signal;
   ii) determining the root mean square of the differentiated geophone signal;
   iii) multiplying the differentiated geophone signal by the root mean square of the hydrophone signal; and
   iv) dividing the product of step (iii) by the root mean square of the differentiated geophone signal.

19. The method of claim 15, step (d) comprises the steps of:
   (1) scaling the hydrophone signal so that its maximum amplitude is substantially equal to the maximum amplitude of the differentiated geophone signal; and
   (2) summing the scaled hydrophone signal with the differentiated geophone signal.

20. The method of claim 19, wherein step (1) comprises the steps of:
   i) determining the root mean square value of the differentiated geophone signal;
   ii) determining the root mean square of the hydrophone signal;
   iii) multiplying the hydrophone signal by the root mean square of the differentiated geophone signal; and
   iv) dividing the product of step (iii) by the root mean square of the hydrophone signal.

21. The method of claim 15, further comprising the step of reducing the reduced noise signal by half.

22. The method of claim 15, wherein the energy source comprises a vibrating energy source.

23. The method of claim 15, wherein the energy source comprises an impulse energy source.

24. The method of claim 15, wherein the energy source is positioned above the ice.

25. The method of claim 15, wherein the energy source is positioned below the ice.

26. The method of claim 13, wherein the energy source is positioned within the ice.

27. The method of claim 15, wherein step (b) further comprises steps of applying phase correction to the hydrophone signal.

28. The method of claim 15, wherein step (b) further comprises steps of applying phase correction to the geophone signal.

29. A method of obtaining seismic data in regions where ice covers water, comprising the steps of:
   (a) using an energy source to generate a seismic wave in the ice;
   (b) sensing seismic disturbances initiated by the energy source with a hydrophone and an accelerometer to produce a hydrophone signal and an accelerometer signal, respectively; and
   (c) providing a reduced noise signal by scaling and summing the hydrophone signal with the accelerometer signal.

30. The method of claim 29, wherein step (c) comprises the steps of:
   (1) scaling the accelerometer signal so that its maximum amplitude is substantially equal to the maximum amplitude of the hydrophone signal; and
   (2) summing the scaled accelerometer signal with the hydrophone signal.

31. The method of claim 30, wherein step (1) comprises the steps of:
   i) determining the root mean square value of the hydrophone signal;
   ii) determining the root mean square of the accelerometer signal;
   iii) multiplying the accelerometer signal by the root mean square of the hydrophone signal; and
   iv) dividing the product of step (iii) by the root mean square of the accelerometer signal.

32. The method of claim 29, wherein step (c) comprises the steps of:
   (1) scaling the hydrophone signal so that its maximum amplitude is substantially equal to the maximum amplitude of the differentiated geophone signal; and (2) summing the hydrophone signal with the accelerometer signal.

33. The method of claim 32, wherein step (1) comprises the steps of:
   i) determining the root mean square value of the accelerometer signal;
   ii) determining the root mean square of the hydrophone signal;
   iii) multiplying the hydrophone signal by the root mean square of the accelerometer signal; and
   iv) dividing the product of step (iii) by the root mean square of the hydrophone signal.

34. The method of claim 29, further comprising the step of reducing the reduced noise signal by half.

35. The method of claim 29, wherein the energy source comprises a vibrating energy source.

36. The method of claim 29, wherein the energy source comprises an impulse energy source.

37. The method of claim 29, wherein the energy source is positioned above the ice.

38. The method of claim 29, wherein the energy source is positioned below the ice.

39. The method of claim 29, wherein the energy source is positioned within the ice.

40. The method of claim 29, wherein step (b) further comprises steps of applying phase correction to the hydrophone signal.

41. The method of claim 29, wherein step (b) further comprises steps of applying phase correction to the accelerometer signal.

42. A method for obtaining seismic data without interference from flexural ice waves, comprising the steps of:
   (a) using a vibrating energy source to generate a seismic wave in the ice;
   (b) sensing seismic disturbances initiated by the vibrating energy source with a hydrophone and a geophone to produce an original hydrophone signal and an original geophone signal, respectively;
   (c) establishing a window that includes the flexural ice wave, and modifying the original geophone signal by setting the original geophone signal to zero outside the window;
   (d) performing a Fast Fourier Transform (FFT) operation on the modified geophone signal of step (d) to produce a geophone phase spectrum;
   (e) modifying the original hydrophone trace by setting the original hydrophone trace to zero outside the window;
   (f) performing an FFT operation on the modified hydrophone trace of step (e) to produce a first hydrophone phase spectrum;
   (g) generating a first integrated hydrophone phase spectrum by subtracting 90° from the first hydrophone phase spectrum; (h) subtracting the first integrated hydrophone phase spectrum from the geophone phase spectrum to produce a spectral phase difference;
   (i) smoothing the spectral phase difference and subtracting 180° therefrom;
   (j) performing an FFT operation on the original hydrophone signal to produce a hydrophone amplitude spectrum and a second hydrophone phase spectrum;
   (k) integrating the hydrophone amplitude spectrum signal by dividing each spectral value of the hydrophone amplitude spectrum signal by $2\pi f$;
   (l) generating a second integrated hydrophone phase spectrum by subtracting 90° from the second hydrophone phase spectrum;
   (m) generating a corrected hydrophone phase spectrum by subtracting the signal produced in step (i) from the second integrated hydrophone phase spectrum;
   (n) performing an inverse FFT operation on the integrated hydrophone amplitude spectrum and the corrected hydrophone phase spectrum to create a time domain hydrophone signal; and
   (o) scaling and summing the original geophone signal and the time domain hydrophone signal.

43. The method of claim 42, wherein the smoothing performed in step (i) comprises averaging the spectral phase difference.

44. The method of claim 42, wherein step (o) comprises the steps of:
   (1) scaling the time domain hydrophone signal so that its maximum amplitude is substantially equal to the maximum amplitude of the original geophone signal; and
   (2) summing the scaled time domain hydrophone signal with the original geophone signal.

45. The method of claim 44, wherein step (1) comprises the steps of:
   i) determining the root mean square value of the original geophone signal;
   ii) determining the root mean square of the time domain hydrophone signal;
   iii) multiplying the time domain hydrophone signal by the root mean square of the original geophone signal; and
   iv) dividing the result of step (iii) by the root mean square of the time domain hydrophone signal.

46. The method of claim 42, wherein step (o) comprises the steps of:
   (1) scaling the original geophone signal so that its maximum amplitude is substantially equal to the maximum amplitude of the time domain hydrophone signal; and
   (2) summing the scaled geophone signal with the time domain hydrophone signal.

47. The method of claim 46, wherein step (1) comprises the steps of:
   i) determining the root mean square value of the original geophone signal;
   ii) determining the root mean square of the time domain hydrophone signal;
   iii) multiplying the original geophone signal by the root mean square of the time domain hydrophone signal; and
   iv) dividing the result of step (iii) by the root mean square of the original geophone signal.

48. The method of claim 42, further comprising the step of reducing the scaled and summed signal of step (o) by half.

49. A method for obtaining seismic data without interference from flexural ice waves, comprising the steps of:
   (a) using a vibrating energy source to generate a seismic wave in the ice;
   (b) sensing seismic disturbances initiated by the vibrating energy source with a hydrophone and a geophone to produce an original hydrophone signal and an original geophone signal, respectively;
   (c) establishing a window that includes the flexural ice wave, and modifying the original hydrophone signal by setting the original hydrophone signal to zero outside the window;

(d) performing a Fast Fourier Transform (FFT) operation on the modified hydrophone signal of step (c) to produce a hydrophone phase spectrum;

(e) modifying the original geophone trace by setting the original geophone trace to zero outside the window;

(f) performing an FFT operation on the modified geophone trace of step (e) to produce a first geophone phase spectrum;

(g) generating a first differentiated geophone phase spectrum by adding 90° to the first geophone phase spectrum;

(h) subtracting the first differentiated geophone phase spectrum from the hydrophone phase spectrum to produce a spectral phase difference;

(i) smoothing the spectral phase difference and subtracting 180° therefrom;

(j) performing an FFT operation on the original geophone signal to produce a geophone amplitude spectrum and a second geophone phase spectrum;

(k) differentiating the geophone amplitude spectrum signal by multiplying each spectral value of the geophone amplitude spectrum signal by $2\pi f$;

(l) generating a second differentiated geophone phase spectrum by adding 90° to the second geophone phase spectrum;

(m) generating a corrected geophone phase spectrum by subtracting the signal produced in step (i) from the second differentiated geophone phase spectrum;

(n) performing an inverse FFT operation on the differentiated geophone amplitude spectrum and the corrected geophone phase spectrum to create a time domain geophone signal; and (o) scaling and summing the original hydrophone signal and the time domain geophone signal.

50. The method of claim 49, wherein the smoothing performed in step (i) comprises averaging the spectral phase difference.

51. The method of claim 49, wherein step (o) comprises the steps of:

(1) scaling the time domain geophone signal so that its maximum amplitude is substantially equal to the maximum amplitude of the original hydrophone signal; and (2) summing the scaled time domain geophone signal with the original hydrophone signal.

52. The method of claim 51, wherein step (1) comprises the steps of:

i) determining the root mean square value of the original hydrophone signal;

ii) determining the root mean square of the time domain geophone signal;

iii) multiplying the time domain geophone signal by the root mean square of the original hydrophone signal; and iv) dividing the result of step (iii) by the root mean square of the time domain geophone signal.

53. The method of claim 49, wherein step (o) comprises the steps of:

(1) scaling the original hydrophone signal so that its maximum amplitude is substantially equal to the maximum amplitude of the time domain geophone signal; and (2) summing the scaled hydrophone signal with the time domain geophone signal.

54. The method of claim 53, wherein step (1) comprises the steps of:

i) determining the root mean square value of the original hydrophone signal;

ii) determining the root mean square of the time domain geophone signal;

iii) multiplying the original hydrophone signal by the root mean square of the time domain geophone signal; and iv) dividing the result of step (iii) by the root mean square of the original hydrophone signal.

55. The method of claim 49, further comprising the step of reducing the scaled and summed signal of step (o) by half.

56. A method of obtaining seismic data free from flexural ice waves, comprising the steps of:

(a) using a energy source to generate a seismic wave in the ice;

(b) sensing seismic disturbances initiated by the energy source with a hydrophone and a geophone to produce a hydrophone signal and a geophone signal, respectively;

(c) applying an initial impulse response pattern to the hydrophone signal to produce a filtered hydrophone signal;

(d) subtracting the filtered hydrophone signal from the geophone signal to produce an output signal; and (e) adjusting the impulse response and repeating steps (c) and (d) one or more times to minimize the output signal.

57. The method of claim 56, wherein step (e) further comprises a step of using an algorithm employing a least squares criteria to determine when the output signal is minimized.

58. The method of claim 56, wherein steps (c) through (e) are performed by applying a linear adaptive filter to the hydrophone and geophone signals.

* * * * *

UNITED STATES PATENT AND TRADEMARK OFFICE
CERTIFICATE OF CORRECTION

PATENT NO. : 5,408,441
DATED : Apr. 18, 1995
INVENTOR(S) : Frederick J. Barr; Gary A. Sitton; David L. Nyland It is certified that error appears in the above-indentified patent and that said Letters Patent is hereby corrected as shown below:

TITLE PAGE, ITEM [54]:
In the Title, "ARTIC" should be --ARCTIC--.

In the Drawings, sheet 12, FIG. 13, box 1312, "HYDROPHONE" should be --GEOPHONE--;
   sheet 14, FIG. 15, above box 1512, "v(t)" should be --p(t)--.
Column 1, line 3, "ARTIC" should be --ARCTIC--;
   line 13, "increasing-cost" should be --increasing cost--;
   line 65, between "ice" and "the", insert --to--.
Column 2, line 19, "Geophysical" should be --Geophysicists--.
Column 5, line 5, equation 1, "p(t)$\alpha$F(t)/A" should be --p(t) $\propto$ F(t)/A--.
Column 6, line 52, between "p(t)." and "When", begin a new paragraph.
Column 7, line 20, "106$^6$" should be --$10^6$--;
   line 23, "meter$_2$" should be --meter$^2$--;
   line 50, equation 5, "dV(t)" should be --dv(t)--.
Column 10, line 27, equation 15, "f(t)" should be --$f^2(t)$--.

UNITED STATES PATENT AND TRADEMARK OFFICE
CERTIFICATE OF CORRECTION

PATENT NO. : 5,408,441
DATED : Apr. 18, 1995
INVENTOR(S) : Frederick J. Barr; Gary A. Sitton; David L. Nyland It is certified that error appears in the above-indentified patent and that said Letters Patent is hereby corrected as shown below:

```
Column 11, line 53 and Column 12, line 51, "w = 2πf" should
     be --ω = 2πf--.
Column 13, line 13, "sources" should be --stations--.
Column 15, line 24, "2.S" should be --2·S--;
     line 34, the period should be a comma;
     line 44, "unconducted" should be --uncorrelated--.
Column 16, line 2, between "with" and "hydrophone", insert
     --the--.
Column 17, line 65, between "claim 15" and "step (d)",
     insert --wherein--.
Column 18, line 26, "claim 13" should be --claim 15--;
     line 67, "differentiated geophone" should be
     --accelerometer--.
Column 19, line 45, "step (d)" should be --step (c)--;
     line 55, between "spectrum;" and "(h)", begin
     a new paragraph.
```

Signed and Sealed this

Second Day of January, 1996

Attest:

BRUCE LEHMAN

Attesting Officer

Commissioner of Patents and Trademarks